(12) United States Patent
O'Donnell

(10) Patent No.: US 7,958,104 B2
(45) Date of Patent: Jun. 7, 2011

(54) CONTEXT BASED DATA SEARCHING

(76) Inventor: Shawn C. O'Donnell, Trabuco Canyon, CA (US)

( * ) Notice: Subject to any disclaimer, the term of this patent is extended or adjusted under 35 U.S.C. 154(b) by 380 days.

(21) Appl. No.: 12/043,889

(22) Filed: Mar. 6, 2008

(65) Prior Publication Data

US 2008/0222142 A1    Sep. 11, 2008

Related U.S. Application Data

(60) Provisional application No. 60/893,831, filed on Mar. 8, 2007.

(51) Int. Cl.
*G06F 17/30* (2006.01)
(52) U.S. Cl. ......... 707/706; 707/710; 707/722; 707/726
(58) Field of Classification Search .................. 707/706, 707/710, 722, 726; 709/223–224
See application file for complete search history.

(56) References Cited

U.S. PATENT DOCUMENTS

| | | | | |
|---|---|---|---|---|
| 5,706,501 | A * | 1/1998 | Horikiri et al. | 709/226 |
| 5,832,484 | A * | 11/1998 | Sankaran et al. | 1/1 |
| 6,185,553 | B1 | 2/2001 | Byrd et al. | |
| 6,370,543 | B2 | 4/2002 | Hoffert et al. | |
| 6,490,579 | B1 | 12/2002 | Gao et al. | |
| 6,584,464 | B1 | 6/2003 | Warthen | |
| 6,594,670 | B1 | 7/2003 | Genser | |
| 7,027,987 | B1 | 4/2006 | Franz et al. | |
| 7,076,255 | B2 | 7/2006 | Parupudi et al. | |
| 7,171,379 | B2 * | 1/2007 | Menninger et al. | 705/28 |
| 7,664,734 | B2 * | 2/2010 | Lawrence et al. | 1/1 |
| 2003/0125948 | A1 * | 7/2003 | Lyudovyk | 704/257 |
| 2004/0107088 | A1 * | 6/2004 | Budzinski | 704/10 |
| 2004/0139106 | A1 * | 7/2004 | Bachman et al. | 707/104.1 |
| 2004/0254842 | A1 * | 12/2004 | Kirkegaard | 705/22 |
| 2005/0108001 | A1 * | 5/2005 | Aarskog | 704/10 |
| 2006/0015416 | A1 * | 1/2006 | Hoffman et al. | 705/28 |
| 2006/0080321 | A1 * | 4/2006 | Horn et al. | 707/10 |
| 2006/0195425 | A1 * | 8/2006 | Deem et al. | 707/3 |
| 2007/0033531 | A1 * | 2/2007 | Marsh | 715/738 |
| 2007/0038603 | A1 * | 2/2007 | Guha | 707/3 |
| 2007/0112714 | A1 * | 5/2007 | Fairweather | 706/46 |
| 2007/0124297 | A1 * | 5/2007 | Toebes | 707/5 |
| 2007/0198506 | A1 * | 8/2007 | Attaran Rezaei et al. | 707/5 |
| 2007/0226082 | A1 * | 9/2007 | Leal | 705/27 |
| 2008/0228746 | A1 * | 9/2008 | Markus et al. | 707/5 |

(Continued)

OTHER PUBLICATIONS

Entrepreneurs See a Web Guided by Common Sense, The New York Times, nytimes.com, Nov. 12, 2006, 4 pages.

(Continued)

*Primary Examiner* — Hanh B Thai
(74) *Attorney, Agent, or Firm* — Douglas L. Weller

(57) ABSTRACT

Systems, methods, and software are provided for facilitating data searching over a network. For example, in one implementation, a first component may be adapted to communicate with a user via a user device over the network. A second component may be adapted to receive a search request from the user via the user device over the network, process the search request by identifying zero or more contexts related to the user based on information that may be passed with the search request or via other sources, and provide zero or more search results in response to the search request. A database may be adapted to store information, including contextual information, related to the user. The second component may select information from the database related to zero or more contexts in order to provide zero or more search results to the user. Various other implementations are also provided.

24 Claims, 19 Drawing Sheets

U.S. PATENT DOCUMENTS

| | | | |
|---|---|---|---|
| 2008/0281614 A1* | 11/2008 | Subramanian et al. | 705/1 |
| 2009/0157643 A1* | 6/2009 | Gollapudi et al. | 707/5 |
| 2009/0204547 A1* | 8/2009 | Rowan | 705/80 |
| 2009/0254510 A1* | 10/2009 | Omoigui | 706/55 |

OTHER PUBLICATIONS

Why Is This Man Smiling?, http://www.fastcompany.com/magazine/114/features-why-is-this-man-smiling.html, Mar. 2007, 7 pages.

Blog >> Archive, Web 3.0 +(4C +P +VS), http://www.sramanamitra.com/blog/572, Feb. 14, 2007 to Jun. 13, 2007, 14 pages.

Social Networks << Kindalab's Blog, http://blog.kindalab.com/2007/10/26/information-spreading-through-social-networks/, Oct. 26, 2007 to Oct. 30, 2007, 6 pages.

The Impending Social Search Inflection Point, http://searchengineland.com/07043-040029-.php, Apr. 3, 2007 to Apr. 17, 2007, 5 pages.

Semantic Web: Difficulties with the Classic Approach, http://www.readwriteweb.com/archives/semantic_web_difficulties_with_classic_approach.php, Sep. 19, 2007 to Oct. 3, 2007, 17 pages.

Top-Down: A New Approach to the Semantic Web, http://www.readwriteweb.com/archives/the_top-down_semantic_web.php, Sep. 20, 2007, 6 pages.

Twine: The First Mainstream Semantic Web App?, http://www.readwriteweb.com/archives/twine_first_mainstream_semantic_web_app.php, Oct. 18, 2007 to Oct. 19, 2007, 10 pages.

That 2020 Vision again!, http://heyjude/wordpress.com/2007/03/17/that-2020-vision-again/, Mar. 17, 2007 to Mar. 19, 2007, 2 pages.

* cited by examiner

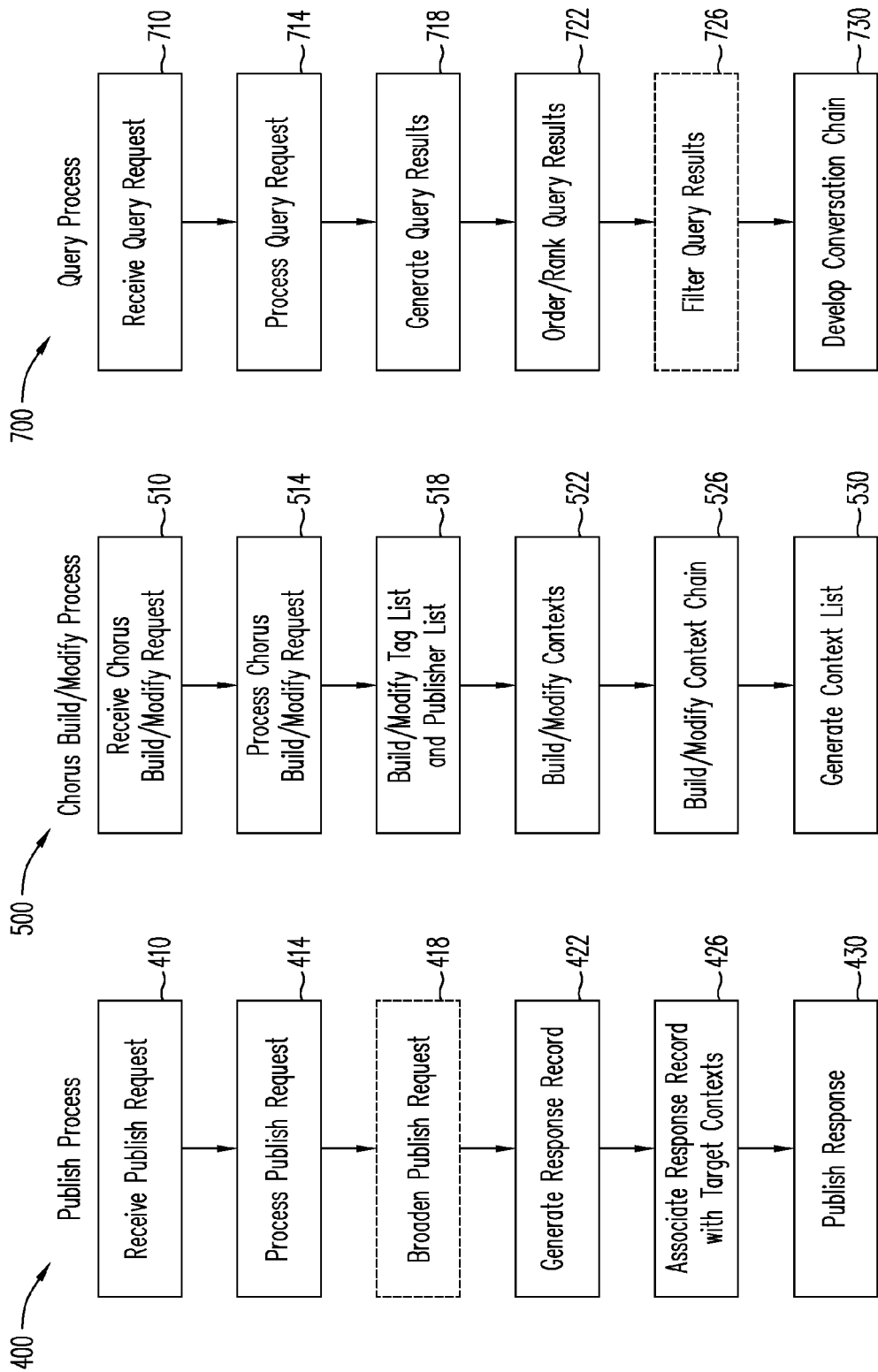

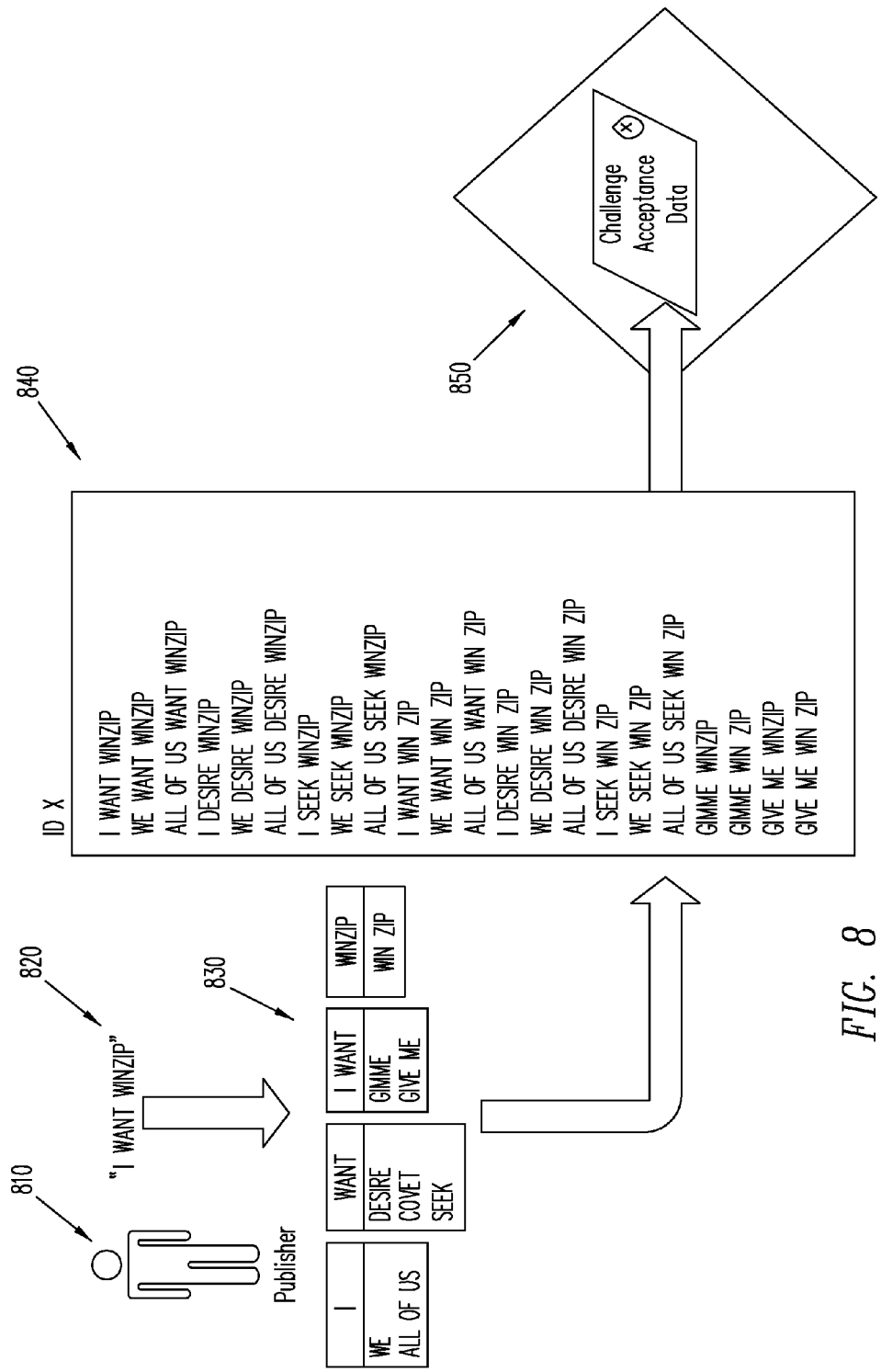

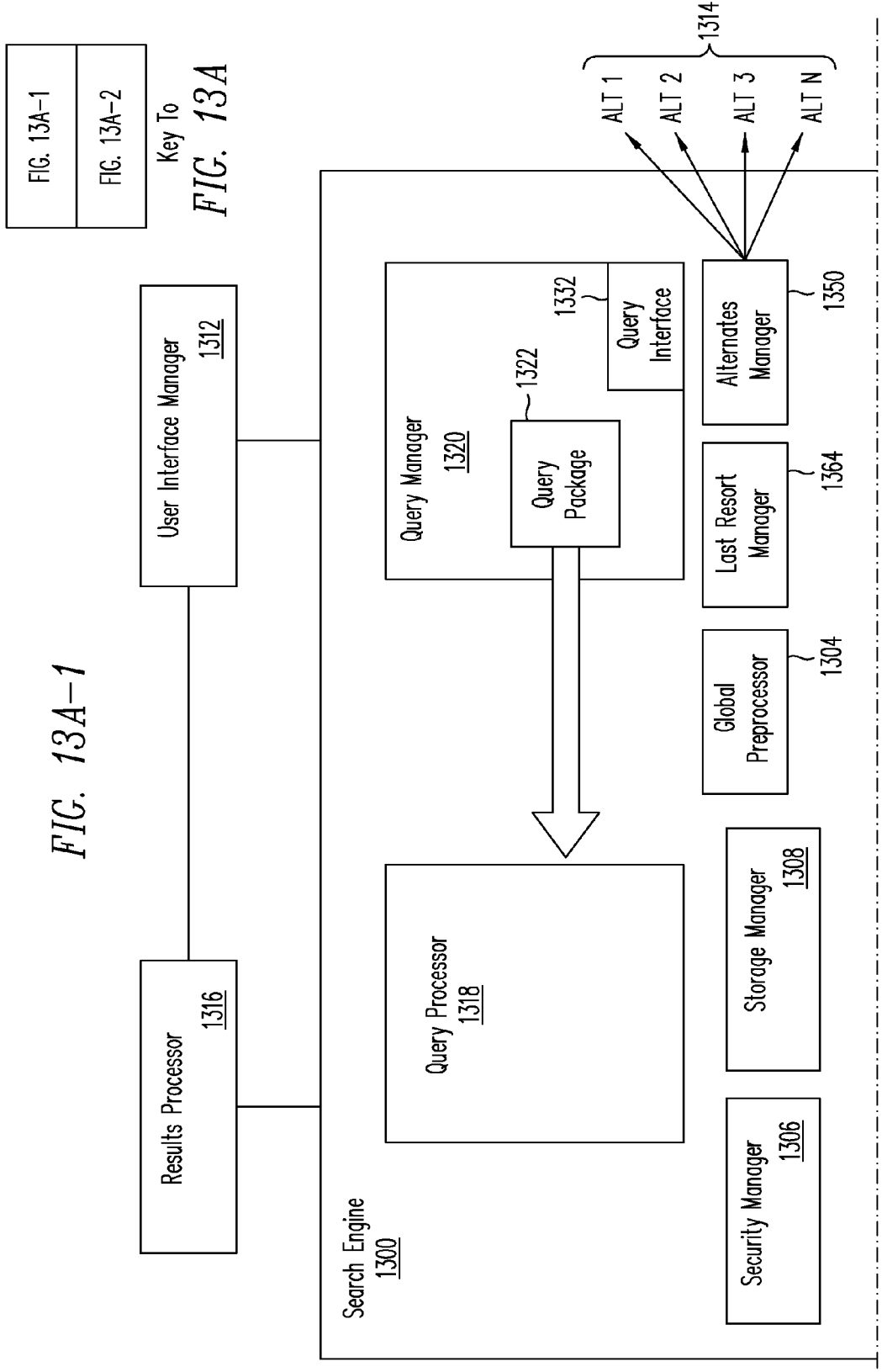

CONTEXT BASED DATA SEARCHING

CROSS-REFERENCE TO RELATED APPLICATIONS

The present application claims the benefit of U.S. Provisional Patent Application Ser. No. 60/893,831 entitled, "COLLABORATIVE CONTEXT BASED SOCIAL SEARCH ENGINE" filed Mar. 8, 2007, which is hereby incorporated by reference herein in its entirety.

BACKGROUND

1. Field of the Present Invention

The present invention generally relates to data searching and more particularly to systems and methods for context based data searching.

2. Related Art

In the modern era, information and knowledge have been digitally aggregated on a large scale in electronic based repositories, such as computer databases, and globally made available to the human populous via communication networks, such as the Internet. Such networks may include collections of electronic documents (e.g., web pages) organized by keywords, subjects, and other relationships. Conventional search engines typically search and categorize web pages by these relationships.

However, this conventional searching process can be tedious and inconvenient. In particular, conventional search engines often fail to properly interpret or understand the particular information desired by users. Thus, there currently exists a need to improve the information search techniques used in network environments.

SUMMARY

Embodiments of the present disclosure provide various systems, methods, and software for facilitating data searching over a network. For example, in one embodiment, a first component may be adapted to communicate with a user via a user device over the network. A second component may be adapted to receive a search request from the user via the user device over the network, process the search request by identifying zero or more contexts related to the user based on information that may be passed with the search request or via other sources, and provide zero or more search results in response to the search request. A database may be adapted to store information, including contextual information, related to the user. The second component may select information from the database related to zero or more contexts in order to provide zero or more search results to the user.

These and other features and advantages of the present disclosure will be more readily apparent from the detailed description of the embodiments set forth below taken in conjunction with the accompanying drawings.

BRIEF DESCRIPTION OF THE FIGURES

FIG. 4 shows a block diagram of a publishing process in accordance with an embodiment of the present disclosure.

FIG. 5 shows a block diagram of chorus building and modifying process in accordance with an embodiment of the present disclosure.

FIG. 7 shows a block diagram of a method for querying the system in accordance with an embodiment of the present disclosure.

FIG. 8 shows a block diagram of a response abstraction in accordance with an embodiment of the present disclosure.

Figure 1:
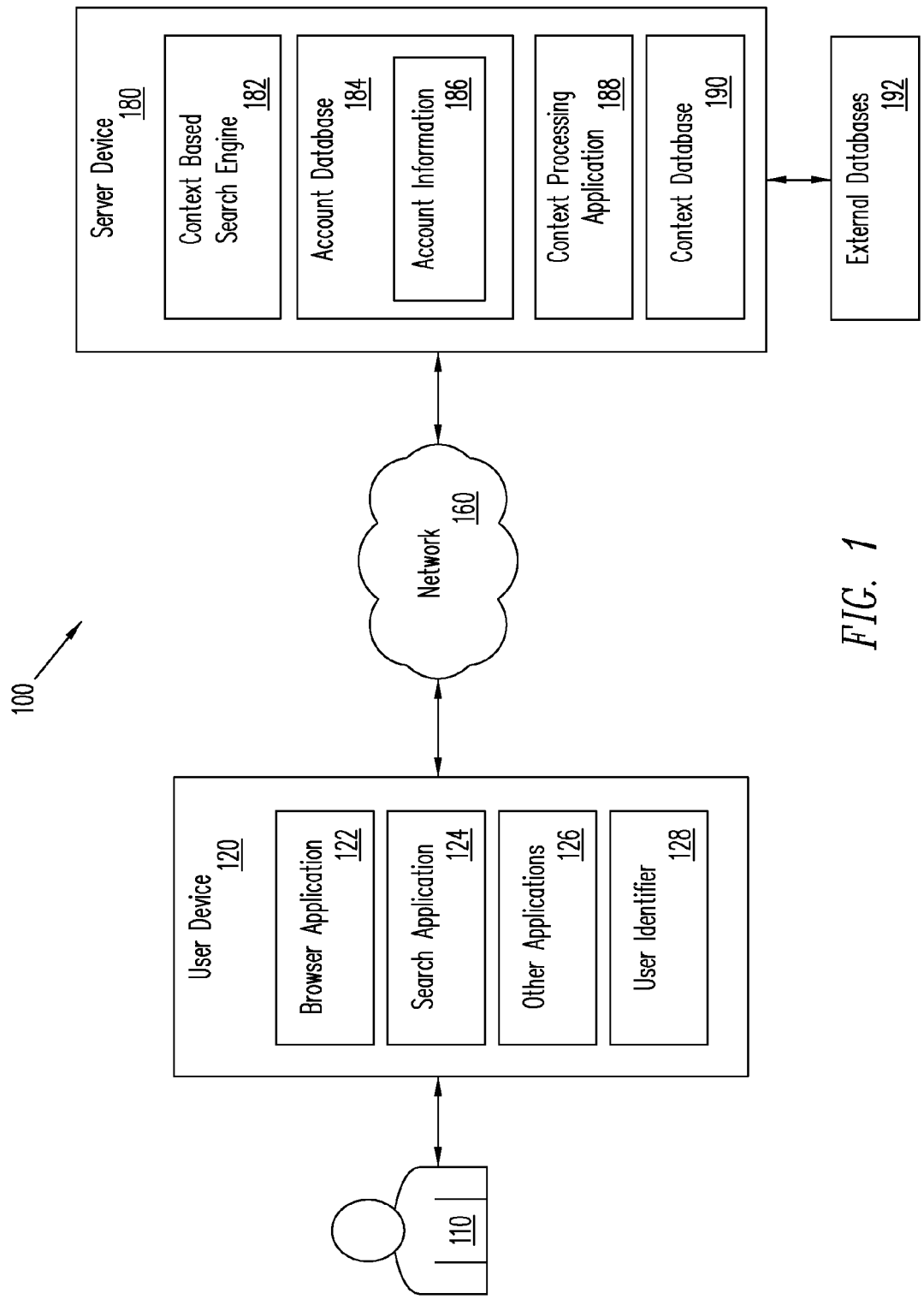
FIG. 1 shows a block diagram of a networked system configured to facilitate data searching in accordance with an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Communication networks, such as the Internet, may include interlinked databases (e.g., information repositories) that include collections of electronic documents organized, for example, by keyword, subject, graph relationship, and/or various other relationships. The present disclosure provides various techniques to perform context based data searching of information repositories in communication networks to allow a user to "talk" in common language constructs to the communication network and retrieve desired information by other users that have published to the information repositories in the communication networks. As discussed herein, building a repository database that a user may use conversationally with a context based search engine that interprets and/or understands the user's requests provides improved organizational and computational techniques for more efficient and convenient use of the communication network.

In various implementations, a context based search engine in accordance with the present disclosure associates one or more data objects (e.g., user data objects, publisher data objects, tag data objects, and/or other data objects) to information available in the communication network and associates this information with one or more network devices (e.g., user devices and server devices) in the communication network. These data objects may be combined into collective data objects (e.g., context data objects), and these collective data objects may be associated to the network devices in the communication network. Other data objects, such as responses and challenges, may be associated with one or more users by the context based search engine when a search is requested and generated. These and other aspects of the present disclosure are described in greater detail herein.

FIG. 1 shows one embodiment of a block diagram of a system 100 configured for data searching over a network 160. As shown in FIG. 1, system 100 includes at least one user device 120, such as a client device, and at least one server device 180, in communication over the network 160. It should be appreciated that the user device 120 may alternately be referred to as a user machine or a client device or machine, and server device 180 may alternately be referred to as a server machine or a network server or machine.

The network 160 may be implemented as a single network or a combination of multiple networks. For example, in various embodiments, the network 160 may include the Internet and/or one or more intranets, landline networks, wireless networks, and/or other appropriate types of communication networks. In another example, the network 160 may include a wireless telecommunications network (e.g., cellular phone network) adapted to communicate with other communication networks, such as the Internet.

The user device 120, in one embodiment, may be implemented using any appropriate combination of hardware and software configured for wired and/or wireless communication over the network 160. For example, the user device 120 may be implemented as a personal computer of a user 110 (e.g., the user may also be referred to as a client) in communication with the network 160. In other examples, the user device 120 may be implemented as a wireless telephone (e.g., cellular phone), personal digital assistant (PDA), notebook computer, and/or various other generally known types of computing devices.

The user device 120, in one embodiment, may include one or more browser applications 122 which may be used, for example, to provide a user interface to permit the user 110 to browse information available over the network 160. For example, the browser application 122 may be implemented as an intranet browser to view information over an intranet and/or a web browser to view information available over the Internet.

The user device 120, in one embodiment, may include a search application 124 for data searching on the network 160, which is described in greater detail herein. In one implementation, the search application 124 comprises a software program, such as a graphical user interface (GUI), executable by a processor that is configured to interface and communicate with one or more server devices 180 via the network 160. The user 110 may perform data searches and view search results by accessing and communicating with the server device 180 via the browser application 122 of the user device 120.

In one implementation, upon installation of the search application 124, the user 110 may be prompted to establish a user account with the server device 180, wherein the user 110 may use the user device 120 to access the server device 180 via the network 160. When establishing a user account, the user 110 may be asked to provide personal information, (e.g., a user name, password, photograph image, biometric id, address, phone number, and/or other personal information) and, in some instances, financial information, such as banking information, credit card information, user account numbers, security information and/or other financial information.

In another implementation, the user 110 may use the context based search engine 182 without establishing a user account. For example, the context search engine 182 may temporarily create a default user account for the user 110, or the context search engine 182 may generate default parameters for the user 110. For example, when a user submits a query without an associated user account, the server device 180 may utilize a default set of contexts supplied by a system operator. If no default set of contexts is supplied, or the system operator disables this feature, the server device 180 may then provide "most popular" results, which are drawn from contexts system-wide and without a user-associated context chain.

The user device 120, in one embodiment, may include other applications 126 as may be desired in particular embodiments to provide additional features available to the user 110. For example, such other applications 126 may include security applications for implementing user-side security features, programmatic user applications for interfacing with appropriate application programming interfaces (APIs) over the network 160, or various other types of generally known programs and/or applications. In another example, such other applications 126, may be used to provide user-side pre-processing and/or post-processing for performing various tasks in response to operations selected by the user 110.

The user device 120, in one embodiment, may include one or more user identifiers 128, which may be implemented, for example, as operating system registry entries, cookies associated with the browser application 122 and/or search application 124, identifiers associated with hardware of the user device 120, and/or various other appropriate identifiers. The user identifier 128 may include attributes related to the user 110, such as personal information and, in some instances, financial information. In various implementations, the user identifier 128 may be passed with a user search request to the server device 180, and the user identifier 128 may be used by the server device 180 to associate the user 110 with a particular user account maintained by the server device 180, in a manner as described herein.

The server device 180, in one embodiment, may be maintained, for example, by an online service provider, which may provide search results for network based search requests submitted by the user device 120 on behalf of the user 110. In this regard, the server device 180 may include one or more context based search engines 182, which may be configured to interact with the user device 120 over the network 160 to facilitate context based network searches by the user 110. In one embodiment, the context based search engine 182 works with an account database 184, a context processing application 188, a context database 190, and external databases 192 to provide information to the user 110 and generate responses and/or search results for the user 110. In various implementations, responses and/or search results are personalized for the user 110. These and other aspects of the present disclosure are described in greater detail herein.

The server device 180, in one embodiment, may be configured to establish and maintain one or more user accounts and/or server accounts in an account database 184, each of which may include account information 186 related to individual users, including user 110, and/or other servers in communication with the network 160. For example, account information 186 may include personal information, confidential information, and/or financial information of the user 110. Such information may be used to establish and maintain a user account with the user 110. In various other embodiments, the methods and systems described herein may be modified to accommodate one or more other users and/or one or more other servers that may or may not be associated with an existing user and/or server account.

In one embodiment, the context processing application 188 may select contextual information, parameters, and characteristics from the context database 190 to be provided in search results to user 110. In various implementations, the context processing application 188 may select appropriate contexts for network searches requested by user 110 based on, for example, user identifier 128, account database 184, account information 186, and/or various other types of information, parameters and characteristics. These and other embodiments of the context based data searching is described in greater detail herein.

Server device 180, in one embodiment, may communicate with one or more external databases 192 in a variety of ways and situations. For example, the server device 180 may use the external databases 192 as archival storage and/or overflow storage for information related to the network 160 and/or network devices in the network 160, such as information related to the user 110 and the user device 120. In another example, the sever device 180 may retrieve information stored in the external databases 192.

The system 100, in one embodiment, may be implemented using a client-server model, in which some operations (e.g., user interfacing, data validating, pre-processing and post-processing) are performed on the user device 120 (e.g., client device), and other operations (e.g., the bulk of system processing) are performed on one or more server devices 180 (e.g., network servers). In other embodiments, the user device 110 may be adapted to provide the bulk of system processing. In one implementation, the user device 120 may be in communication with the server device 180 via the network 160 for processing network search requests made by the user 110, wherein the user device 120 operates as a user interface to access the context based search engine 182 from the server device 180. In this instance, the server device 180 processes network search requests requested by the user 110 from the user device 120 via the network 160.

The system 100, in one embodiment, may be implemented as an Internet application, wherein the browser application 122 may be provided to the user device 120 as a user interface to the Internet for accepting user queries, displaying results, and interacting with the user 110 in other ways. In this form, the system 100 may provide an interface to the Internet via server device 180, and the browser application 122 may be used to interface with the system 100. In this model, some subsystems may reside on one or more web server devices on the network 160, while other server devices may support the web server devices as part of a distributed web-based application.

In one implementation, referring to the Internet application, a plug-in module (e.g., one of the other applications 126) for the browser application 122 may be used to augment user interface capabilities to support speech recognition. For example, input from a microphone may be supported and context-based vocabulary, grammar, and acoustical models may be downloaded, updated, and managed by the plug-in module, in concert with the system, to modify the speech recognition system and improve voice recognition for the domain of topics that are relevant to the user 110. Speech recognition and other related aspects thereof are described in greater detail herein.

The system 100, in one embodiment, may be embedded within a device including a special-purpose device, such as a kiosk, television, elevator, soda machine, or other special-purpose device capable of supporting the hardware and operating system requirements of the system 100. In one implementation, the special purpose device may be in communication with the network 160 for network search requests made by the user 110.

The system 100, in one embodiment, may be self-contained, with the user interface and all subsystems residing on a single computer system. In one implementation, searches may take place on a single computer system having one or more internal databases and a user interface to accept search requests by the user 110.

The system 100, in one embodiment, may be chained to other systems in some situations, such as when one system has information in response to a query. For example, a system embedded within an elevator may defer to a system within the building, and this may defer to a municipal system, and so forth. This interconnection may use a gateway of last resort approach and may include a full range of routing techniques and technologies used by network routing systems.

In various implementations, as described herein, each user device 120 and server device 180 may be associated with a particular link (e.g., a link, such as a Uniform Resource Locator (URL) to an Internet Protocol (IP) address). In this regard, the server device 180 may optionally redirect the browser application 122 to an appropriate webpage and/or web site to facilitate data searching.

Figure 2A:
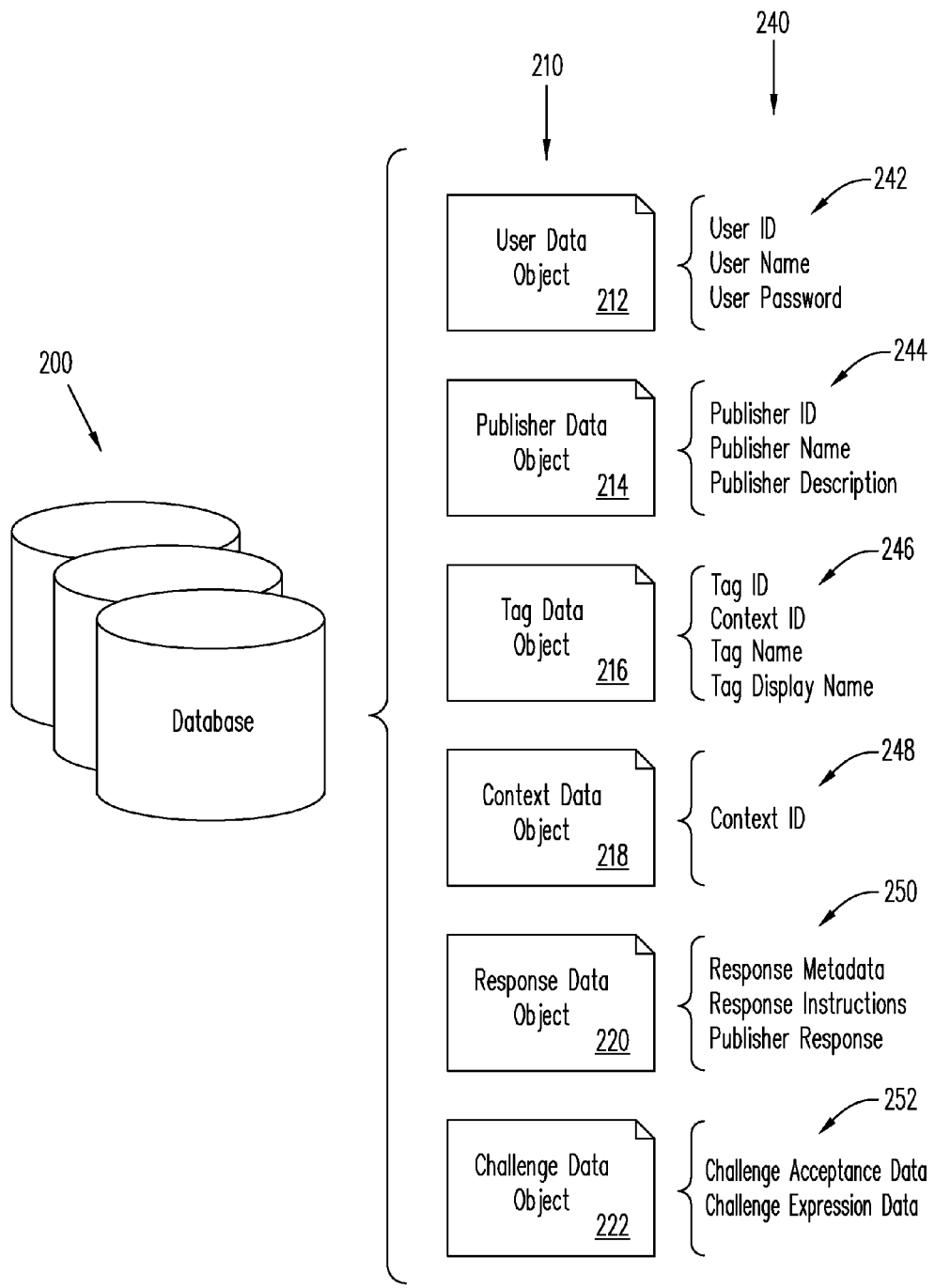
FIG. 2A shows a block diagram of data objects in accordance with various embodiments of the present disclosure.
Figure 2B:
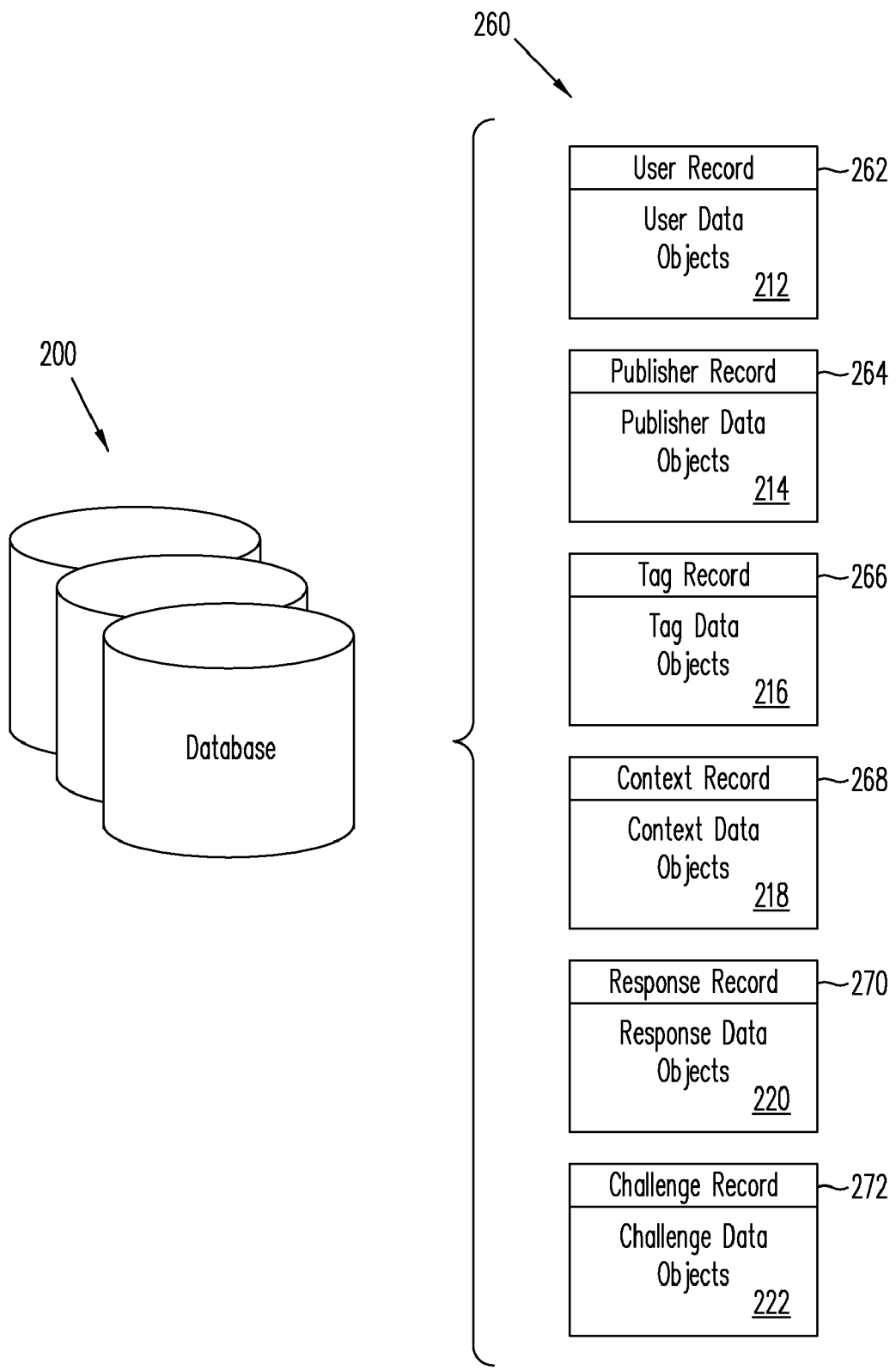
FIG. 2B shows a block diagram of database records in accordance with various embodiments of the present disclosure.

Referring to FIGS. 2A-2B, the server device 180 maintains a plurality of data objects 210 in one or more databases 200, such as the account database 184 and/or context database 190 of FIG. 1. These data objects 210 include a user data object 212, a publisher data object 214, a tag data object 216, a context data object 218, a response data object 220 and a challenge data object 222. As shown in FIG. 2A, each of the data objects 210 include parameters and information 240 associated therewith. As shown in FIG. 2B, a plurality of data objects 210 may be stored in associated records or tables 260.

In one embodiment, one or more users including user 110 may be associated with a user data object 212 stored in one or more databases 200 with user parameters and related information 242, such as a user ID and a credential. Referring to FIG. 2B, a plurality of user data objects 212 may be stored in a user record 262. In various implementations, the user data object 212 may represent a human user or a machine user of the system 100. The user ID, in one embodiment, uniquely identifies a user, such as the user 110, within the system 100 and may comprise a globally unique identifier, such as user identifier 128, to provide portable compatibility for multiple independent systems to work with multiple users.

In one embodiment, one or more publishers may be associated with a publisher data object 214 stored in one or more databases 200 as publisher parameters and related information 244, such as a publisher ID and one or more additional fields that may include descriptive information about the publisher data object 214, such as publisher name and publisher description. Referring to FIG. 2B, a plurality of publisher data objects 214 may be stored in a publisher record 264. In various implementations, the publisher data object may represent the viewpoint of one or more users across a range of searchable topics, parameters and/or characteristics. The publisher ID, in one embodiment, uniquely identifies a publisher (e.g., a user or server that publishes information) within the system 100 and may be a globally unique identifier, such as a user identifier or machine identifier, to facilitate interaction between multiple independent systems. The publisher, in one embodiment, may be thought of as an entity (e.g., person, company or organization) that provides and/or asserts information having a certain character or quality. For example, a publisher may represent a particular person's perspective on various political, social and economic topics. The publisher may grant permission to other users (e.g., staff associated with the publisher) to contribute information in the publisher's name.

In one embodiment, the publisher may represent the views of an individual user or information published by an individual application or machine, such as a Web server. In another embodiment, many users may publish information as a single publisher, and many applications or machines may publish information as a single publisher. In another embodiment, the publisher may represent information published by people, applications and machines. The users, in one embodiment, may contribute content as one or more publishers. For example, at different times, the user may publish a perspective that represents personal views, such as a favorite club, a current employer and/or an owned company. In another embodiment, the user may publish a perspective in the name of more than one publisher in a single instruction. The user, in one embodiment, may publish to a number of publishing spaces, which may be referred to as contexts, in a single instruction or separate instructions. For example, a person may publish a single unit of information that is relevant to the person's charity foundation, the person's constituency, and/or to a particular news episode by publishing to contexts for each of these topic categories simultaneously or separately. As such, in various implementations, a response may be published simultaneously or separately to several contexts at the discretion of the publisher. The term "simultaneously" may refer to a single user action, and the actual publishing may or may not refer to the literal definition of simultaneously.

A tag, in one embodiment, comprises a tag data object 216 that may be stored in one or more databases 200 and include tag information 246, such as a tag ID that associates a word or phrase with a context. Referring to FIG. 2B, a plurality of tag data objects 216 may be stored in a tag record 266. The tag record 266 may contain a tag ID, context ID, a tag name, a tag display name, and other fields, such as a tag text field. One or more symbols, such as "+", may be reserved within tag text to support a special meaning (e.g., a union), and any such reserved symbol may be disabled or escaped (e.g., if the symbol itself is intended) using escaping syntax, such as that employed in a computer programming language, such as C language. For instance, the tag "text A+B" may be written as "A\+B" to prevent the phrase from appearing to the system and other observers as the union of context A and context B. In one example, a slash symbol may be represented as "\\".

In various implementations, by using a special reserved symbol (e.g., "+"), the user 110 may refer to the context as a conceptual union of multiple independent contexts. For instance, the tag text "A+B+C" may refer to a context as a conceptual union of three other contexts: context A, context B, and context C. As such, the tag "A+B+C" may refer to a separate context and represent the conceptual union of its constituents by community convention, which may be reinforced and supported by the chorus building process, as described in greater detail herein. In one aspect, tag text may be canonicalize alphabetically, such that various ordered contexts including "A+C+B", "C+B+A", "B+A+C", and "B+C+A" may be converted to "A+B+C" prior to any processing, and other characters (e.g., white-spaces and alpha-numerics) may be canonicalized prior to processing. In another aspect, a general tag may represent views intended for everyone, wherein the general tag may be viewed as a "no context" context. As such, a response published without a specified context may be published to a general tag. In some cases, a general tag may be added to tag lists when building a chorus or context chain, as described in greater detail herein.

In one implementation, when a publisher publishes a response to a tag and/or a context via a tag, a reference may be associated with a public context associated with that tag, and a separate, private, version of that context may be controlled or at least stored along with other responses only by that publisher. For example, when the user 110 publishes to a public context, the server device 180 may create a related private context and create a reference to the public context response within the related private context. Any additional responses from this same publisher to this same public context may be added by reference in this related private context. In some instances, the user 110 may direct the server device 180 to add this private context, if available, to their chorus so that only this publisher's views are added to their chorus. The sever device may automatically create other such contexts and create other such references to responses as needed to achieve this and other goals. In another implementation, tags associated with a user may be organized into groups, and these groups may be enabled or disabled, which may exclude them from the chorus building operation, which is described in greater detail herein.

In one embodiment, tags may be added and/or removed from tag groups. Tag groups may be ordered and/or nested. Nested tag groups may be numbered immediately after their parent for the purpose of "unwinding" these groups. Nested groups may be numbered immediately after their parent for the purpose of "unwinding" these groups to form an array. For example, a nested group (e.g., a nested tree) may include the following.

Topic 1
Component 1
Type 1-1
Type 1-2
Type 1-3
Component 2
Type 2-1
Type 2-2
Type 2-3

An array "unwound" from the nested group may include the following.

[Topic 1] [Component 1] [Type 1-1] [Type 1-2] [Type 1-3] [Component 2] [Type 2-1] [Type 2-2] [Type 2-3]

Since the individual contexts are of interest, the server device 180 may generate the array as follows:

[Type 1-1][Type 1-2][Type 1-3][Type 2-1][Type 2-2][Type 2-3]

In various embodiments, users and/or automata may add or remove tags from these groups. Some tags, and/or tag groups, may be designated so as to exclude them from being combined with other tags in the combining portion of the chorus building process, which is described in greater detail herein.

In one embodiment, one or more contexts may be associated with a context data object 218 stored in one or more databases 200 with context parameters and related information 248, such as a context ID. Referring to FIG. 2B, a plurality of context data objects 218 may be stored in a context record or table 268. In various implementations, the context may represent a publishing space in which the interpretation of a query is decided de facto by zero or more users that publish to that space. As described herein, a publisher may contribute a response data object 220 to a context in anticipation of a challenge. As such, a publisher may publish a response to a challenge within a context.

The context, in various implementations, may be associated with data and/or data structures via the context ID of the particular context. The context may be associated with one or more vocabularies, grammars and/or acoustical models within the meaning usually ascribed to these terms in the context of a commercial speech recognition engine. The context may be associated with a community forum offering community and/or system provided news, links, photos, events, calendar items, people, groups, organizations, products, journal entries, recommendations, suggestions, references to other forums and other context-oriented content. The context may be associated with a human-readable easily understood word or phrase that refers to the context. The context may be associated with permissions that specify ownership of a particular context, including authorized users that may publish to and/or alter the context along with other permissions regarding the context.

The context, in various implementations, may be associated with various types of settings. For example, settings may influence how, where and/or when queries (e.g., or a specific query) is processed in reference to a specific context. Settings may determine the types of responses that may be permitted and/or the range of capabilities that may be supported by the context and/or supplied or otherwise provided to publishers and/or responses. Settings may control the information or access to information and/or system resources and/or application resources that may be made available to responses or the system when processing a query or response. Settings may determine the persistence of the context if loaded into system memory.

The context, in various implementations, may be associated with other attributes and/or data structures. In one example, the context may be related via a relationship record to another entity via its context ID. In another example, the context may be associated with arbitrary data, such as a virtual object, a virtual location, a physical location, an idea, a device, a philosophy, a goal, a subculture, a group, a person, an organization, a community, a region, a service, a software program, a device, a route, a problem, an event, a photo, a photo album, a news item, a date, a time, a task, a recommendation, and/or a product. This relationship record may include the context ID of a particular context, an object ID representing the entity that will be associated with the context, and may also include a field that identifies the type of related object. As such, both the type identifier and the object identifier of this record may be represented by a globally unique identifier to allow for a wide variety of object and object types that may interoperate between systems with less conflict.

The context, in one implementation, may be considered private when permission to add, modify and/or remove responses from the context record are assigned to a single publisher. It should be appreciated that, even though system administrators and other types of users other than publishers may have permission to add, modify and/or remove responses, their actions do not affect the context's status as "private" within the meaning of this description. In one aspect, the "private" context holds references to responses that are approved by a particular publisher and consistent with the particular character or quality of information that is provided by the particular publisher. In one embodiment, a publisher may not publish to a tag that includes a tag component referring to a private context of another publisher unless specifically allowed by that publisher for that private context. Moreover, the user 110 may not combine a reference to a public context, such as Public Context A, with a private context, such as a Private Context A, and publish to the tag Public Context A+Private Context A. In one aspect, only the Private Context A publisher may do this unless otherwise permitted by the Private Context A publisher. Private contexts may be associated with a list of popular related public contexts. A public context, in one embodiment, comprises a context in which no one publisher controls the content. Responses associated with the public context are consistent with the conceptual theme of the context, but may likely represent the views of a number of publishers.

A response, in one embodiment, comprises a response data object 220 that may be stored in one or more databases 200 and encapsulates response information 250 including response metadata, response instructions and a response of a publisher to an anticipated challenge. Referring to FIG. 2B, a plurality of response data objects 220 may be stored in a response record or table 270. In one implementation, the system may "cast" the binary data object to any recognizable format (e.g., a binary large object, also referred to as a "data blob," having a known byte-order) and ignore any structures or parameters that are unrecognizable. The system may look to a portion of a data blob, such as the first n bytes, to determine the nature of the data blob. The system may look to response metadata to determine the nature of the data blob. The system may choose to treat the data blob as an object or potential object, or the system may choose to treat the data blob as data having some predefined data structure. The system may validate the structure using a widely accepted mechanism, such as that used in XML documents. The system operator may indicate to the system that the format of any data blob class (e.g., challenge acceptance, metadata, or others) in advance. The system may assign a format to each data blob class on a per-response basis, and this information may be retrieved by the system at any time to examine and process a data blob.

Response data, in one embodiment, may comprise a data blob supplied by publishers and interpreted by the context based search engine 182. The format and contents of this data are subject to the conventions of the community and capabilities of the system that interpret the response. Response data may comprise information that may be interpreted as instructions for the results processor 1316 to execute. These instructions may include displaying response text, pushing a context onto the user's context chain, creating an object on the user's whiteboard, and/or performing host-device and/or other related tasks. In one aspect, response metadata comprises a data blob that may comprise information about the response, such as who published the response, how long the response is valid, and various other related data that may be used by the system to evaluate, render and/or express the response. In another aspect, the response instructions may include recommended commands or other instructions for other devices in communication with the server device 180 and/or the network 160.

In one embodiment, a challenge data object 222 may be associated with a response data object 200, maybe stored in one or more databases 200, and may include challenge information 252 (e.g., including challenge acceptance data and challenge expression data). Referring to FIG. 2B, a plurality of challenge data objects 222 may be stored in a challenge record or table 272. In one implementation, challenge acceptance data comprises a data blob supplied by publishers and interpreted by the context based search engine 182. The challenge acceptance data may comprise various information (e.g., a Unicode string or regular expression) that may be matched against query information (e.g., various information in or associated with a query package or other data) to determine if the response is applicable. The challenge acceptance data may comprise code or refer to code (e.g. via a URL) that may be executed or interpreted to evaluate a query.

It should be appreciated that the format of user input and the checking performed to determine whether such input meets the challenge acceptance criteria of a response may be considered a pluggable aspect of the system, and many different methods may be employed on the same system at the same time under various circumstances. To make the system as compatible as possible, the system operator may reduce or expand operations that determine how and whether to match a query against a given response.

Figure 3A:
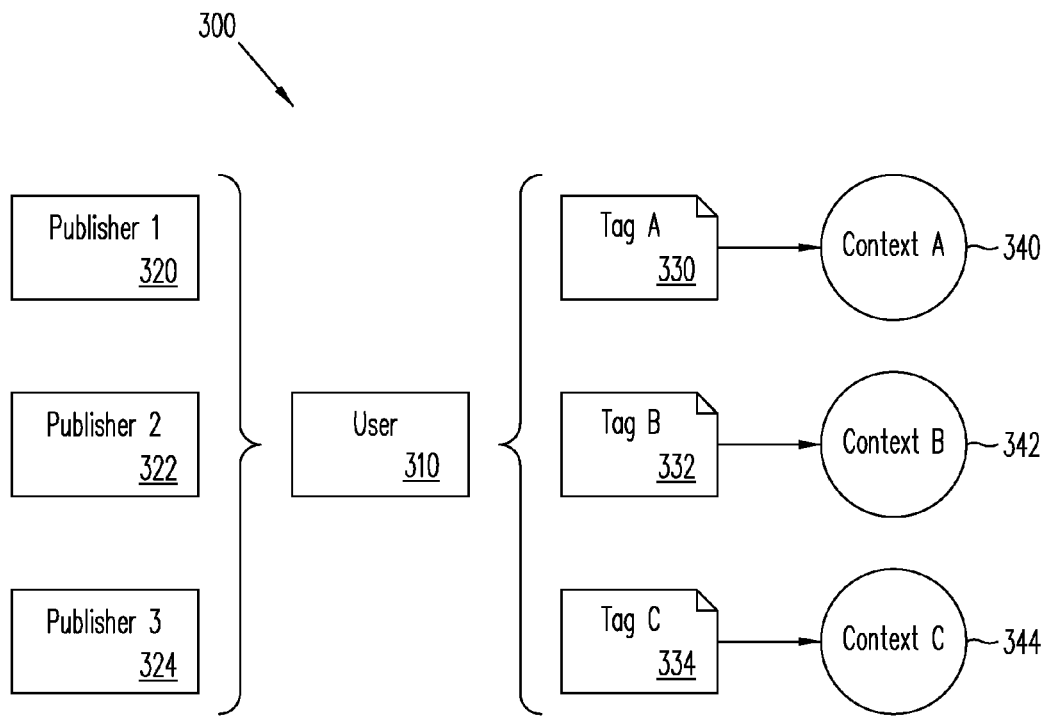
FIGS. 3A-3B show block diagrams of various relationships between components of the system in accordance with various embodiments of the present disclosure.

FIG. 3A shows one embodiment of a relationship 300 between a user 310, a plurality of publishers 320, 322, and 324, a plurality of tags 330, 332, and 334, and a plurality of contexts 340, 342, and 344. In various implementations, the user 310 (e.g., user 110 of FIG. 1) may be associated with an ordered list of preferred publishers 320, 322, 324 and an ordered list of descriptive tags 330, 332, 334. As previously described, a tag may comprise a data object that associates a word or phrase with a context. Thus, as shown in FIG. 3A, each of the tags 330, 332, and 334 are associated with a particular context 340, 342, and 344, respectively. As previously described, a publisher may comprise a data object that represents a viewpoint of one or more users, such as user 310 and/or user 110 of FIG. 1, across a range of topics. These and other aspects of the present disclosure are described in greater detail herein.

Figure 3B:
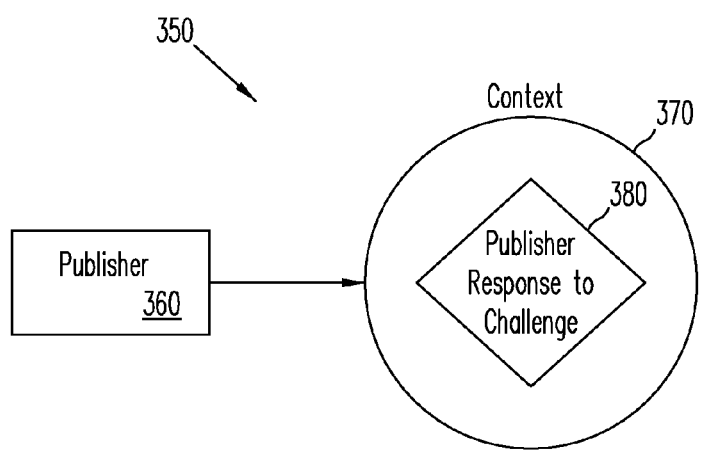

FIG. 3B shows one embodiment of a relationship 350 between a publisher 360 and a context 370. As previously described, a context may comprise a data object that represents a publishing space. Thus, in one implementation, as shown in FIG. 3B, the publisher 360 publishes a response 380 to a challenge within the context 370. These and other aspects of the present disclosure are described in greater detail herein.

Figure 3C:
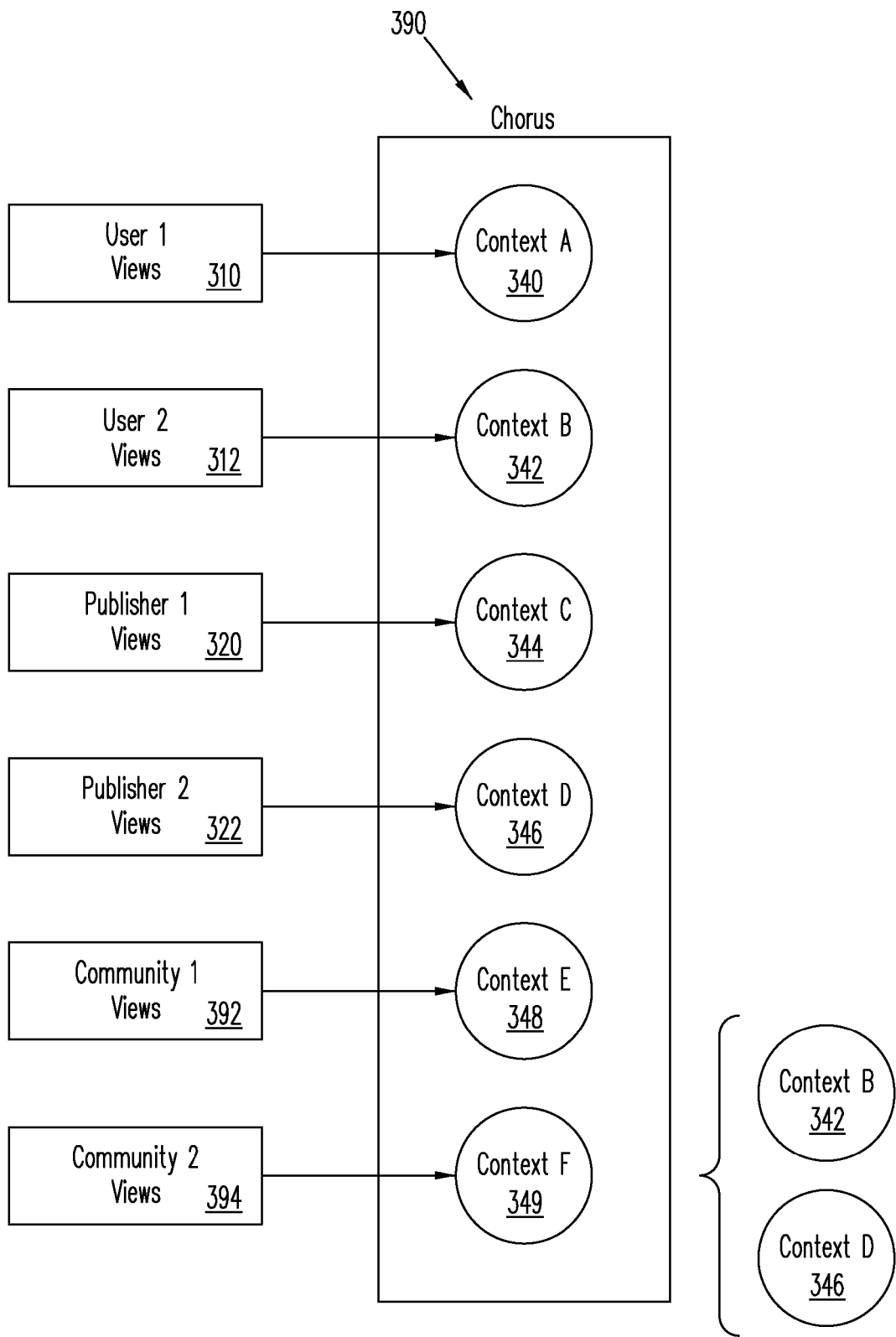
FIG. 3C shows a block diagram of a chorus in accordance with various embodiments of the present disclosure.

FIG. 3C shows one embodiment of a chorus 390 (e.g., context chain) that may comprise an array of one or more contexts 340, 342, 344, 346, 348, and 349 and/or context groups representing multiple contexts, such as contexts 342 and 346. In one implementation, a chorus may be associated with a user, such as user 310 and/or user 110 of FIG. 1, and may represent one or more publishers, such as publishers 320, 322, and 324, and one or more communities 392, 394 that the user has selected to assist with a series of challenges. In various implementations, a context may be public or private; contexts and/or context groups within a chorus may be re-ordered; contexts and/or context groups within a chorus may be enabled or disabled; contexts and/or context groups) within a chorus may be added and removed; and context groups may comprise one or more contexts and/or other context groups. The chorus may be processed with various processing techniques, including First-In/Last Out (FILO) order. These and other aspects of the present disclosure are described in greater detail herein.

In one embodiment, the user 110 may publish information to a plurality of separate contexts. For example, a publisher may publish multiple responses to the same challenge in different contexts. However, a publisher may only publish one response to a given challenge in a given context. In another example, the same challenge may be answered by multiple publishers within a context. In still another example, there may be one copy of the response, and any alteration to the response may be reflected wherever such a reference appears. There may be other instances in which each context holds a reference to a distinct copy of the response, in which case, one instance may be altered while leaving the other instances unchanged.

In one implementation, a publisher may publish as response to a first tag, which may cause the system to store a reference to the response as a private context and a separate public context. For example, a publisher P1 may publish a response to a tag A which may cause the server device 180 to store a reference to the response in private context P1A and public context A.

Referring to FIG. 3A, publishers may be associated with a particular user and may be organized into groups, and these groups may be enabled or disabled, which may exclude them from the chorus building operation, as described in greater detail herein. The users, applications and/or machines may add or remove publishers from publisher groups. In various implementations, publisher groups may be ordered and/or nested. Nested groups may be numbered immediately after their parent for the purpose of "unwinding" these groups to form an array. The publisher that is added to a publisher group (or publisher list, if groups are not used) may be explicitly associated with an array of specific tags. However, in some implementations, some publishers may be excluded from the chorus building process. In one aspect, only the specific contexts associated with these publishers may be added to the chorus. In such a case, a general tag may be excluded from the chorus building process for this publisher according to system and/or user preferences.

Referring to FIGS. 3B-3C, publishers may specify one or more publishing contexts by combining zero or more tags to represent related contexts. In various implementations, the chorus building may combine tags to build an array of contexts to be added to the chorus as part of the chorus building process. Responses may include actions that modify the context chain to produce a context chaining behavior. Responses may be abstracted via a recursive operation that utilizes a database of phrase replacements to broaden the range of challenge acceptance criteria for a response. Users may provide answers or collaborate with other users to answer on a topic within a context (e.g., the public/private nature of responses and contexts combined with the publishing rules). These and other aspects are described in greater detail herein.

Pragmatics, in one embodiment, refers to members of a community that use context to determine what a user or publisher means. Grammar, syntax, and semantics may be used for machine processing of natural language, which may be less important than pragmatics involved when a community of publishers interpret the meaning of queries and determine how to satisfy them. For example, a particular phrase may have no recognizable grammar, syntax, or semantics for the reader, but this particular phrase may have meaning for some publishers in some contexts (e.g., one or more publishers may give this expression meaning by publishing a response to the phrase in one or more contexts). In one aspect, an expression that appears to have a plain meaning may be given alternate meanings in other contexts. In another aspect, an expression that is tightly bound to a context (e.g., a meaning that it is rarely or never anticipated in other contexts) may be used to identify one or more contexts in which to interpret subsequent expressions.

In various implementations, referring to FIG. 3C, users, publishers and communities may be linked so that queries produce immediate, useful results and simultaneously connect users with the people, organizations, ideas and resources that are important to them over longer periods. For example, publishers may respond to a particular statement within a particular context. As such, the system may choose an appropriate context based on the personal situation of the user, such as user 110. The system may choose a response in the chosen context, and this response may provide immediate and useful information, provide a context to evaluate follow-up questions, and associate the response with a constellation of people, organizations, ideas, news, events, images, products, services and/or resources that may be important for the user over longer periods. In one implementation, a query may work to place users within a community, and the act of publishing may assist with creating such communities. For example, a particular phrase may associate the user 110 with other users that are related by circumstance (e.g., context) and share similar sentiments. It should be appreciated that pragmatics may be recognized without dismissing the utility of grammar, syntax and semantics when making sense of a query at various levels of processing.

In various implementations, the system 100 may allow a publisher to publish only one response to a given query in a given context. The system 100 may allow a publisher to publish one or more responses to the same query in different contexts. The system 100 may permit other publishers in the same context to each provide their own response to a given query. A response may be valid for a range of queries. Within a given context a single publisher may not publish a response having an overlapping query acceptance range. That is, the publisher may not publish more than one response that would be valid for any given query input. In cases where the range of valid inputs is decided by a formula (e.g., software program) or would otherwise be undetermined until a given query is evaluated (e.g., when a user query in triggers multiple responses from the same publisher), the system may disable one or more of the offending or conflicting responses. As such, the system 100 may record or store disabled responses as action items in the remaining enabled response to be resolved by any permitted publisher.

In various embodiments, the hardware demands of the context may depend on the number of responses stored within the context, frequency of access to the context, type of processing that is required by the context, and/or various other factors. In one example, multiple contexts may be processed in parallel, wherein contexts may be sized to appropriate server hardware according to the level of processing required to serve each context. In another example, contexts may be distributed across a range of servers, wherein the context may be replicated to a number of servers so that conventional load balancing techniques may be used to reduce the load on one server. In another example, the context may be distributed across a number of servers, wherein each hosts a population of responses from that particular context. As such, the system 100 may query multiple servers in parallel, collate, rank and order the responses as though the responses originated from a single server. In still another example, the system 100 may distribute responses to a number of servers according to a strategy, and use the knowledge of this strategy to query only a portion of the cluster to reduce the overall computational load of each query. Commercial clustering technology may be used to distribute individual responses across a range of servers in system 100.

The context, in various implementations, may have a defined interface to a library that hides the details of how queries are processed. The context may employ any number of techniques to process a query including but not limited to simple text processing, traditional application logic, neural networks, mechanical Turks, and various other methods. On the other hand, some contexts may have no processing capability of their own and rely solely on the library to gather relevant information from the context, process the gathered information, and present the results to a challenger. Moreover, for any given query, a subset of contexts may have no relevant responses. As such, contexts may provide information to the system that describe conditions for relevance to reduce computational demand of the system, the context, or both.

The system, in one embodiment, may reduce publisher-supplied challenge acceptance data (e.g., anticipated query text) to a one or more keywords to support keyword-formed queries. The system may identify the rank of each word within an anticipated query by retrieving the word frequency from a commercial corpus for the language native to the publisher. The system may take the highest ranked words and create a list of unique combinations of these words and use at least a portion of this list to broaden the range of user input that may trigger a response. Words that are not represented in the chosen corpus (e.g., collection) may be assumed to be highly unique and included among the n words. The system may develop a corpus from response examples provided by publishers, and/or from the accumulated user input of multiple users, and use this corpus to numerically assign a uniqueness value to one or more words. In various implementations, a publisher may supply one or more response examples.

A conversational library or repository, in one embodiment, need not be limited to retrieving documents. As such, the conversational library may respond to the challenge by taking actions. The library may not need to "query" per-se, but rather challenge the library to satisfy a response by any available means, which may include sending instructions to one or more subsystems and/or devices connected to the library to achieve a desired effect. For example, a publisher may cause the library to satisfy a challenge by providing instructions as part of a response. In another example, a publisher may anticipate a query in a particular context and provide instructions as part of the response.

In various implementations, a context may be associated with a response via a context ID stored, for example, in the response metadata and/or response instructions, wherein the context may be available to publishers that want to publish a response to a follow-up challenge to the previous challenge. A context may be associated with a response via response instructions that cause a particular context to be pushed onto the user's context chain. In one implementation, the system may only allow the authoring publisher to edit a private response. Other types of users, such as administrators and operators may modify a response and perform other actions on a response within a response's status as private. In another implementation, a community response may be edited by any publisher considered in good standing on the system as determined by the system operator. Multiple publishers may collaborate in "Wiki" fashion to edit a response and potentially revert a response to a previous edit. In some instances, the system may allow only one community response to a given challenge per context. In one aspect, in cases where challenge acceptance criteria may overlap, the most recently added overlapping acceptance items may be removed, and references to newer responses may be added to the original response. For example, a "to-do" item may be associated with the remaining response to allow one or publishers to resolve the conflict at a later time.

FIG. 4 shows one embodiment of a method 400 for processing a publish request by a server device, such as server device 180 of FIG. 1, wherein the publish request is received from a user device, such as user device 120 of FIG. 1.

Referring to FIG. 4, the server device 180 receives a publish request from the user device 120 (block 410). In one implementation, a user, such a user 110 of FIG. 1, provides information in the form of a publish request to the server device 180 via the user device 120 and the network 160. The user may provide the publish request in the name of a publisher, and the information in the publish request may identify a target context, challenge acceptance criteria, and response instructions.

Next, the server device 180 processes the received publish request (block 414). Next, the server device 180 may optionally broaden the scope off the receive publish request (block 418). In one implementation, the anticipated user input may be broadened to include a wider range of user input via the abstraction and/or reduction process.

Next, the server device 180 generates a response record based at least on information passed with the publish request (block 422). Next, the server device 180 associates the generated response record with one or more target contexts identified in the publish request (block 426). In one implementation, the information passed with the publish request may be packaged by the server device 180 in the generated response record and associated with one or more target contexts.

Next, the server device 180 publishes a response based at least one the generated response record (block 430). In one implementation, the response may be published to and/or associated with a private context specific to the publisher.

In one embodiment, the server device may provide a sample response population for a particular challenge. For example, a challenge may include multiple answers (e.g., one or more private and/or community answers) in multiple contexts, but the server device 180 may allow no more than one community answer per context. In other examples, some contexts may have no community answers while others may have only one community answer. In still other examples, some contexts may have one or more private answers and one or more community answers.

In various implementations, the server device 180 may recognize a preferred status of certain publishers, tags, and/or contexts on a per-user basis. This designation may come automatically to a tag or publisher with addition to the user's associated tag, publisher list, and/or set explicitly by the user on a publisher, tag, and/or context. Some contexts, tags, and/or publishers may be designated as preferred for a plurality of users, at the direction of the system operator. The user may associate certain credentials and/or privileges with a publisher, tag, and/or context that may be recognized on a per-user basis by the query processing module and/or the results processing module. These processing modules may recognize the preferred status of these entities and attach special processing treatment, such as additional and/or extended capabilities.

For example, a response published by an ordinary publisher may call for a regular expression to be used to validate the user's query against the challenge acceptance criteria of a response. The system may ignore this requirement for an un-preferred publisher, but may honor the requirement (e.g., engage the additional processing power necessary to perform the requirement) for a preferred publisher. As such, the publisher may request that a query submitted to a private context of the publisher be passed electronically to a third-party system for acceptance and response processing, but this request may only be honored if it is so preferred by a given user. In various implementations, a response in a context may take actions via, for example, response instructions that require credentials for the user, which may be passed to the context and to other responses within the context if the context is trusted (e.g., if the context is a private context to that user). It should be appreciated that a query may be referred to as a challenge because the term "query" sounds similar to a question whereas, in the present disclosure, any identifiable digital input to the query system comprises a challenge to one or more publishers to interpret the user's meaning and potentially suggest actions that may satisfy a response.

FIG. 5 shows one embodiment of a method 500 for building a chorus by a server device, such as server device 180 of FIG. 1. Referring to FIG. 5, the server device 180 receives a request to build or modify a chorus related to the user 110 from the user device 120 (block 510). In one implementation, the user 110 provides information to the user device 120 to build or modify (e.g., change) a chorus related to the user 110, which may be in the form of a build/modify request. The user device 120 sends the build/modify request to the server device 180 via the network 160.

Next, the server device 180 processes the received request to build or modify a chorus related to the user 110 (block 514). In various implementations, the processing may include identifying the user 110 and information related to the user, such as one or more related tags, one or more related contexts, and one or more preferred publishers.

Next, the server device 180 builds or modifies a tag list and/or publisher list related to the user 110 (block 518). In various implementations, whenever a tag is added or deleted to a tag list associated with the user, a publisher is added or deleted to a publisher list associated with the user, a publisher or tag group is enabled or disabled, a whiteboard object is added or removed, on demand, on a timer, or in other cases, the chorus building/modifying process 500 may be performed to generate or update the chorus related to the user 110.

As such, in one example, the server device 180 may generate a list of "most personal" tags based on the user's associated tag list. Given an ordered list of tags A, B, C, D, and E, the server device 180 may generate various iterative and/or ordered combinations of these tags in a list (e.g., when set to use a maximum depth of 5 and a minimum depth of 1). For example, some of the combinations may include A+B+C+D+E, A+B+C+D, A+B+C+E, A+B+D+E, A+C+D+E, B+C+D+E, A+B+C, A+B+D, or others. In various examples, the iterative and/or ordered combinations of these tags in the list may vary depending on the desired parameters implemented by the server device 180.

In one implementation, a first approach uses a process for a maximum combination length of 5 and a minimum combination length of 1. For example, the following output is pushed onto a stack for ordered tags A, B, C, D and E. However, it will be appreciated that any appropriate order may be used in various implementations.

A+B+C+D+E
A+B+C+D
A+B+C+E
A+B+D+E
A+C+D+E
B+C+D+E
A+B+C
A+B+D
A+C+D
B+C+D
A+B+E
A+C+E
B+C+E
A+D+E
B+D+E
C+D+E
A+B
A+C
B+C
A+D
B+D

C+D
A+E
B+E
C+E
D+E
A
B
C
D
E

In another implementation, each entry of the output above may be weighted as follows. ((TAG1WEIGHT)*TAG1COFACTOR)+
(TAG2WEIGHT*TAG2COFACTOR)+
(TAGNWEIGHT*TAGNCOFACTOR))+
(LENGTH*LENGTHCOFACTOR)

In the absence of a specific weight and cofactor for a given tag, the server device 180 may assign a weight based on tag order. For example, given ordered tags A, B, C, D and E, the server device 180 may assign tag weights 5, 4, 3, 2 and 1, respectively. The system operator may assign a length cofactor of 1, and the system operator may assign a default tag factor of 1. The server device 180 may then sort each entry according to the resulting weight, shown at right, to produce the following context order. However, it will be appreciated that any appropriate order may be used in various implementations.

| | |
|---|---|
| A + B + C + D + E | 20 |
| A + B + C + D | 18 |
| A + B + C + E | 17 |
| A + B + D + E | 16 |
| A + B + C | 15 |
| A + C + D + E | 15 |
| A + B + D | 14 |
| B + C + D + E | 14 |
| A + B + E | 13 |
| A + C + D | 13 |
| B + C + D | 12 |
| A + C + E | 12 |
| A + B | 11 |
| A + D + E | 11 |
| B + C + E | 11 |
| A + C | 10 |
| B + D + E | 10 |
| A + D | 9 |
| B + C | 9 |
| C + D + E | 9 |
| A + E | 8 |
| B + D | 8 |
| B + E | 7 |
| C + D | 7 |
| A | 6 |
| C + E | 6 |
| B | 5 |
| D + E | 5 |
| C | 4 |
| D | 3 |
| E | 2 |

In one embodiment, A+B+C+D+E represents a context that accounts for all aspects of the user 110 as known to the server device 180, whereas E represents a least important facet to the user 110. Tags earlier in the user's list are weighted more heavily than tags later in the list, which is described in greater detail herein. In various examples, the tag list generated by the server device 180 may be chosen by a system operator for the user, or the system operator may allow the user to choose a preferred tag list as a persistent user option. In one aspect, duplicate answers (e.g., R1 displayed in P(A) may not be shown in duplicate in (A) even though it may be there.

Next, the server device 180 builds or modifies contexts related to the user 110 (block 522). In various implementations, for each publisher in the user's publisher list and for each tag in the user's "preferred" tag list, the server device 180 checks for one or more private contexts corresponding to one or more particular tags. If the private context exists (e.g., meaning that the publisher has published to that particular tag at some point), the one or more contexts are added to the user's chorus. For each publisher, the server device 180 checks for a general context for each publisher, and if the general context exists, the general context is added to the user's chorus. After one or more publishers have been added to the user's chorus in this manner, public contexts corresponding to the user's "preferred" tags are added. After one or more public contexts have been added, the server device 180 may add the public general context to the user's chorus, if the public general context exists.

In various implementations, the user 110 and/or the server device 180 may manually order, enable, disable, or remove one or more contexts from the chorus at any time. The server device 180 may translate these actions into actions on the tag list and/or publisher list, or the server device 180 may allow the array of contexts to be edited directly. If the server device 180 does not modify the tag list and/or publisher list to reflect a change made directly to these contexts, the array of contexts may be overwritten during the chorus build/modify process 500. In this instance, the user 110 may be prompted to save the context array and provided with options to restore the array at a later time.

Next, the server device 180 builds or modifies the context chain related to the user 110 (block 526). In various implementations, the user's context chain is an array of contexts that may grow or shrink as the conversation progresses. The context chain may be pre-pended to the context array that is generated by the chorus build/modify process 500. The chorus chain may grow when the response instructions of a triggered response push a context onto the chain, and the chorus chain may shrink when the user selects another response and the former instructions are undone and/or when a subsequent query causes the context to be removed. During the processing of a subsequent query the query processing module may examine each context on the context chain in FILO order. The query processing module may remove each context from the context chain that does not satisfy the query, until the query processing module finds a context that does satisfy the query, if any. Then, in one aspect, regardless of whether subsequent contexts may satisfy the query, the contexts build via the chorus building process, rather than adding the contexts as a result of a conversation, and are left in the context chain. In one implementation, contexts in the chorus are not affected and are not removed, and the query processing module may be adapted to generate a results list from one or more contexts in FILO order beginning with contexts in the context chain and continuing through contexts in the chorus until, for example, all contexts are exhausted. In various implementations, the contexts of a context chain may be processed in serial or parallel, without departing from the scope of the present disclosure.

In one embodiment, trusted contexts may receive preferential access to data about the challenger as well as additional processing consideration by the context based search engine 182. The context based search engine 182 processes one or more queries using the chorus. Results may be ranked, ordered and/or filtered. The user may access the most preferred, most personal, or most popular results. Each response may have one or more contexts that may be associated with arbitrary data for various purposes.

Figure 6A:
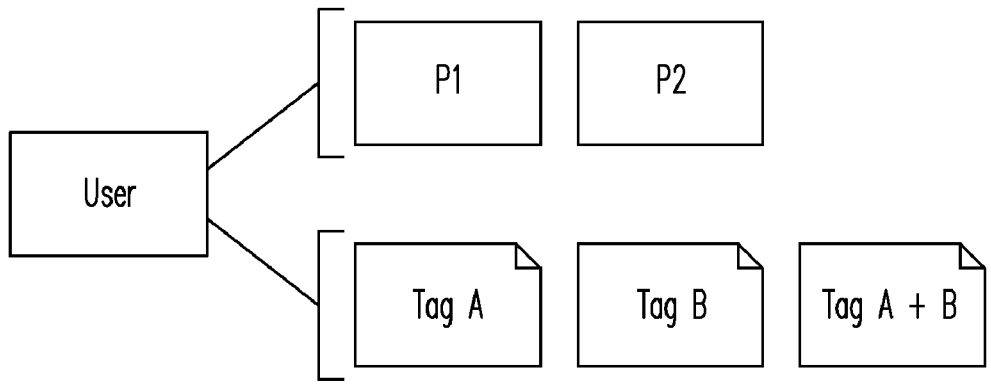
FIGS. 6A-6C show block diagrams of various relationships between components for chorus building and modifying in accordance with an embodiment of the present disclosure.
Figure 6B:
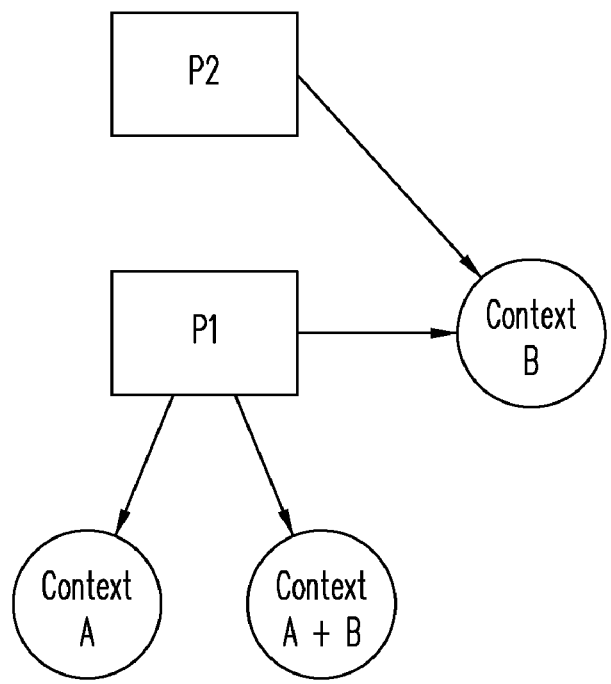
Figure 6C:
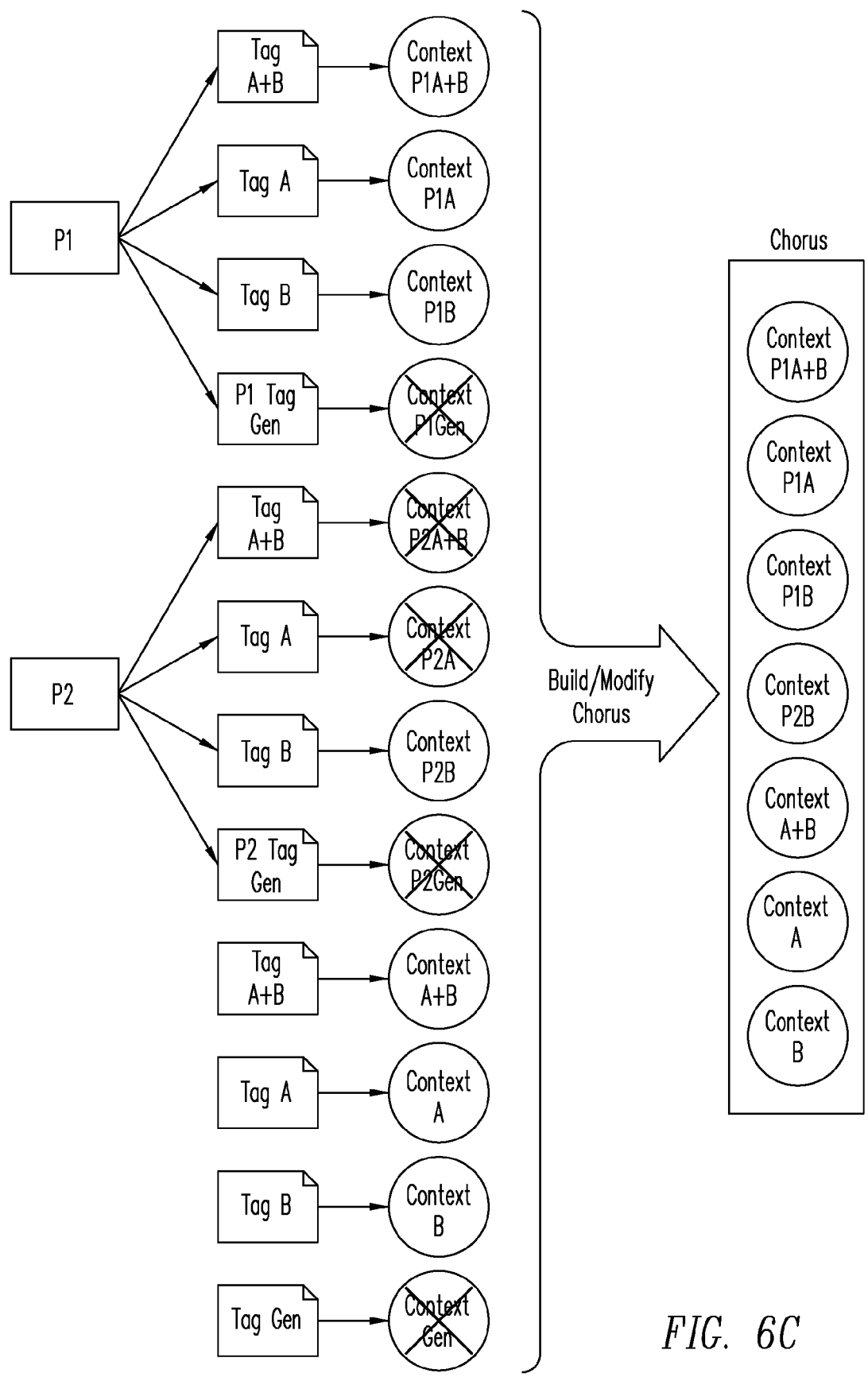

FIGS. 6A-6C show various embodiments of one or more relationships for building and/or modifying a chorus 690. As shown in FIG. 6A, a user 610 may be associated with an ordered list of publishers having one or more publishers 620, 622 and an ordered list of tags having one or more tags 630, 632, and 633. As shown in FIG. 6B, each publisher 620, 622 may be associated with one or more contexts 640, 642, and 643. As such, publisher (A) 620 may be associated with contexts (A) 640, (B) 642, (A+B) 643, and publisher (B) 622 may be associated with context (B) 642. In one implementation, this association may be referred to as a publisher history. As shown FIG. 6C, the chorus 690 may be built and/or modified based on the publisher list of publishers 620, 622, tag list of tags 630, 632, and 633, and the publisher history as defined by the publisher list. In various implementations, the chorus or context chain may be built based on the publisher list, tag list and publisher history, as shown by example in FIG. 6C. These and other aspects of the present disclosure are described in greater detail herein.

FIG. 7 shows one embodiment of a method 700 for processing a query request with the context based search engine 182 by a server device, such as server device 180 of FIG. 1, wherein the query is received from a user device, such as user device 120 of FIG. 1.

Referring to FIG. 7, the server device 180 receives a query request from the user device 120 (block 710). In various implementations, the user 110 may submit a query request to a query manager module of the server device 180. The query manager module receives the query request as an input and passes the receive query request to the query processing module with reference to the user's chorus and host information.

In one example, when implemented as part of a Web-based application, the user 110 may submit a text-based query by entering text into a form input field designated for this purpose, and "clicking" a "submit" button to signal that input is ready to be processed by the server device 180. Input may be entered via any available user input device, including a generally known keyboard. In another example, when implemented as part of a Web-based application, the user 110 may speak into a microphone connected to a personal computer, and a browser plug-in having embedded speech recognition capability may process the speech input, convert the inputted speech to text, and submit the converted text as a user query to the server device 180 via the network 160.

Next, the server device 180 processes the query request (block 714) and generates query results (block 718). In various implementations, the query processing module may pass the query to each context object of the user's context chain and chorus, in parallel where possible. A single result from each context, if any, may then be placed into a result array in chorus (FILO) order. In such a case a reference is provided to obtain the other results from that context, in order. Alternately, hey may be in expanded sequential order. The result processing module may then execute the instructions of the first result in the result array, if any, including instructions to do nothing, run a program, execute a operation, modify the context chain of the user's session, display information (or cause information to be displayed), and/or take other host specific actions. Should the user 110 select an alternate response from the result array, the previous instructions may be undone in a manner of the result processor's choosing. For example, instructions to display text may be undone by refreshing the display and presenting different information for display. As such, instructions to modify the context chain may be reversed, and the context chain may be restored to a previous state. The process may be the same for an unknown user, except the server device 180 may provide an empty context chain and chorus and/or one or more default contexts.

Next, the server device 180 orders and/or ranks the query results (block 722). In one implementation, the server device 180 may order and/or rank the query results by chorus count. Once the query results from a user's chorus have been found, the query processing module may attempt to locate one or more other responses (e.g., in any context) that may satisfy the query. This may be accomplished using a batch approach that is appropriate to the input. For example, if the system allows only text queries, the query processing module may search a database of context challenge acceptance data for one or more responses in contexts for those that at least partially match the query text. These responses may then be added to the result array and ordered by the system-wide rank of each response.

In one implementation, the server device 180 may order and/or rank the query results as a system-wide response. The rank of a response without regard to it's context may be a operation of the number of choruses that comprise at least one private context of the publisher that published the response. The rank of the response may be increased or decreased by the number of community votes for or against the response.

In another implementation, the server device 180 may order and/or rank the query results as a rank of a response within a context, which may be a operation of the number of choruses that include the context in which the response is published and at least one private context of the publisher that published the response. The operation may add or subtract community votes for or against the response. This "related chorus count" may comprise an input to the system-wide rank operation, and other inputs may be used as well.

In other implementations, other rank signals may be used to determine rank. The rank of a response may be increased if a publisher is highly ranked in a related context. Many users may have a publisher at or near the top of their chorus, and this may be used to adjust the rank of a response published by that publisher. The average percentage population by publisher of the chorus may be used to modify the rank of responses published by the publisher. The rank of a response may be influenced by other information about a publisher, such as the length of time they have been users of the system, the number of responses that they publish, and/or other factors. The server device 180 may provide user interface elements or buttons that allow users to change the order of results that are displayed.

Next, the server device 180 may optionally filter the query results (block 726). In various implementations, the user may select a tag from a related list of tags and/or tag combinations to show only results for one or more particular tags and/or tag combinations, wherein filters may or may not affect the order of results, except to exclude certain responses from the results list.

Next, the server device 180 may develop one or more conversation chains (block 730). In various implementations, conversation chains (e.g., response chains) may be associated with a context that may be pushed onto a context chain when a response is viewed. In one example, this may be accomplished via response instructions that push one or more contexts on a context chain. The system may offer publishers and/or others the opportunity to publish to such contexts, as a convenient way of allowing publisher to anticipate and provide instructions to respond to follow-up input from the user.

FIG. 8 shows one embodiment of a response abstraction 800. In one implementation, a publisher 810 may respond to the essence of a query to generate challenge acceptance data 850 even while the query itself may be phrased in a number of different ways. For example, the phrase 820, "I want ZZZ" and a database 830 of similar words or phrases may be abstracted to have a plurality of related meanings as a list 840, such as "Give me ZZZ," which may mean approximately the same thing to some publishers. In another example, as part of the publishing process, the system may abstract a sample query supplied by the publisher by recursively replacing elements of the sample from a library of corresponding phrase replacements. As such, referring to FIG. 8, a word or phrase (e.g., phrase 820) and a database of replacements (e.g., database 830) may be recursively processed to produce a list (e.g., list 840) of abstracted challenge acceptance criteria for a response.

The server device, in one embodiment, may use context to improve the performance of a commercial or home-grown speech recognition engine. In various implementations, a speech recognition manager module loads missing vocabulary into a speech recognition engine based on the contexts (and context associated vocabulary) of the user's chorus. The speech recognition manager adds weight to the probability that certain words and phrases may be recognized according to data associated with the contexts in the user's chorus. A hypothesis of an n-best hypothesis list may be checked against all possible challenge acceptance data system-wide to potentially eliminate hypothesis that are not valid challenges to the system. The hypotheses of an n-best hypothesis list are validated against the actual challenge acceptance data of responses in each context and, upon match, treated as the actual user query to that context. When all else fails, the system may apply a grammar, vocabulary, and acoustical model on a per context basis to give each context a customized speech recognition engine. These special-purpose speech recognition environments may be used on a per-context basis to select a best hypothesis for each context.

A context, in one embodiment, may be associated with a list of words and phrases ordered by frequency of use in that context. For example, a context may have a list of words and phrases involving elements A, B, and C: A-25, B-12, C-11.

In one implementation, each element of the list may be associated with a number that represents how much weight the phrase has in this context. There may be a number of contexts in the user's chorus involving X, Y, Z: X (A-25, B-12, C-11), Y (D-39, E-20, F-2), and Z(G-8, E-1, I-1).

The server device 180, in one implementation, may perform operations on a commercial speech recognition engine to strengthen the recognition of specific words and phrases by increments. The server device 180 may increase the recognition of element A by 25 increments, element B by 12 increments, element C by 11 increments, and element E by 21 increments, according to the weights of these phrases as associated with the context. The server device 180 may apply an adjustment to such increments to normalize them within a specified range, for a particular speech recognition engine, or for a particular grammar and/or vocabulary and/or acoustical model. The server device 180 may weight phrases more heavily if they are higher in the user's chorus: X+30 (A-25, B-12, C-11), Y+20 (D-39, E-20, F-2), and Z+10(G-8, E-1, I-1).

Element A, in one implementation, may be increased 55 units, element D by 59 units, and element G by 18 units, which may account for additional weight added to the word/phrase weights by virtue of their group position within the chorus and/or context chain. The system may apply various other scales: $X^3$ (A-25, B-12, C-11), $Y^2$ (D-39, E-20, F-2), and $Z^1$ (G-8, E-1, I-1).

Element A may be increased 15,625 ($25^3$), D may be increased 1521 ($39^2$), G may be increased 8 ($8^1$) reflecting the formulaic weight applied to each group. As such, the current context may be weighted more heavily than other contexts or otherwise treated as a special case. The method of increasing the weight may vary across speech recognition engines. For example, when the chorus and/or context chain changes, or otherwise as contexts are added or removed, enabled or disabled, phrase weights may be adjusted accordingly. Given a specific chorus list, the server device 180 may send a customized array of phrases and weights to be applied to the speech recognition system.

The server device 180 may comprise a speech recognition engine (SRE) adapted to recognize words in its SRE vocabulary. To improve general recognition for a specific user, words associated with contexts in the user's chorus or context chain may be added to the SRE vocabulary if they do not already exist. When the chorus and/or context chain changes, or as contexts are added or removed, enabled or disabled, SRE vocabulary may be reviewed, readjusted, and/or updated to the current set of enabled contexts.

In various implementations, context-specific recognition may be used such that each context may be thought of to have it's own speech recognition engine configured with a vocabulary, grammar, and acoustic model that is specific to it. When evaluating audio input for a match to responses within a specific context, this specific speech recognition engine instance may be used when no other matching responses are found via other methods in this section. The server device 180 may use SRE n-Best Query, wherein the top n hypothesis may be tested from the speech recognition engine's n-Best hypothesis list in each context to contribute responses as though each hypothesis is actual user input. Once a hypothesis successfully triggers a response within a given context, the server device 180 may skip any further hypotheses from the n-best hypothesis list for that context. Some hypothesis may be skipped if they are known not to literally be present within any response. The server device 180 may use SRE n-Best Hypothesis Validation, wherein each hypothesis of the n-Best hypothesis list may be validated against known literal challenge acceptance criteria entries within the system. Once a hypothesis is validated, it may be that no further hypothesis will be validated, and this validated hypothesis may be treated as a user input to the system.

Figure 9A:
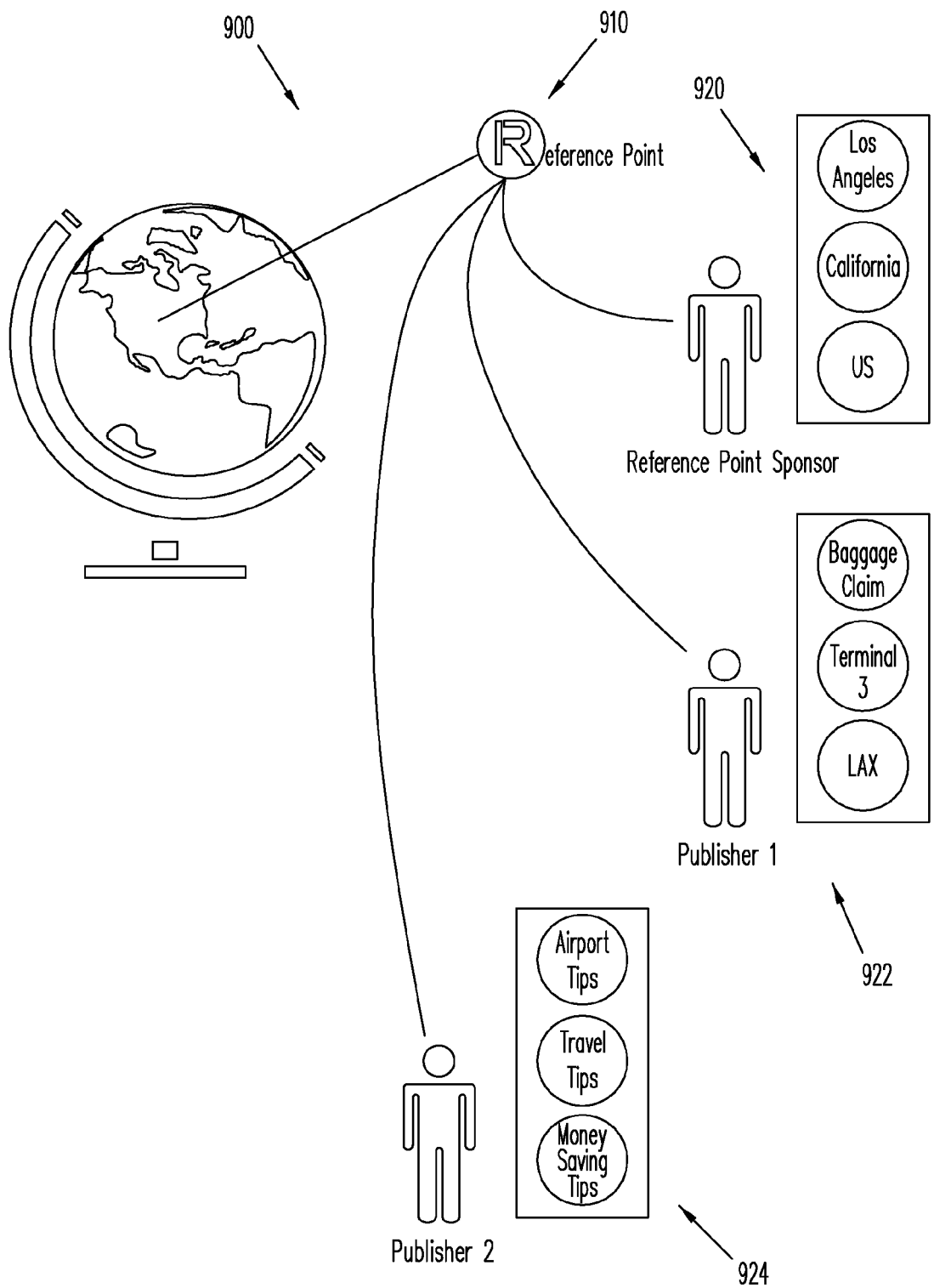
FIGS. 9A-9B show block diagrams of location awareness processes in accordance with various embodiments of the present disclosure.
Figure 9B:
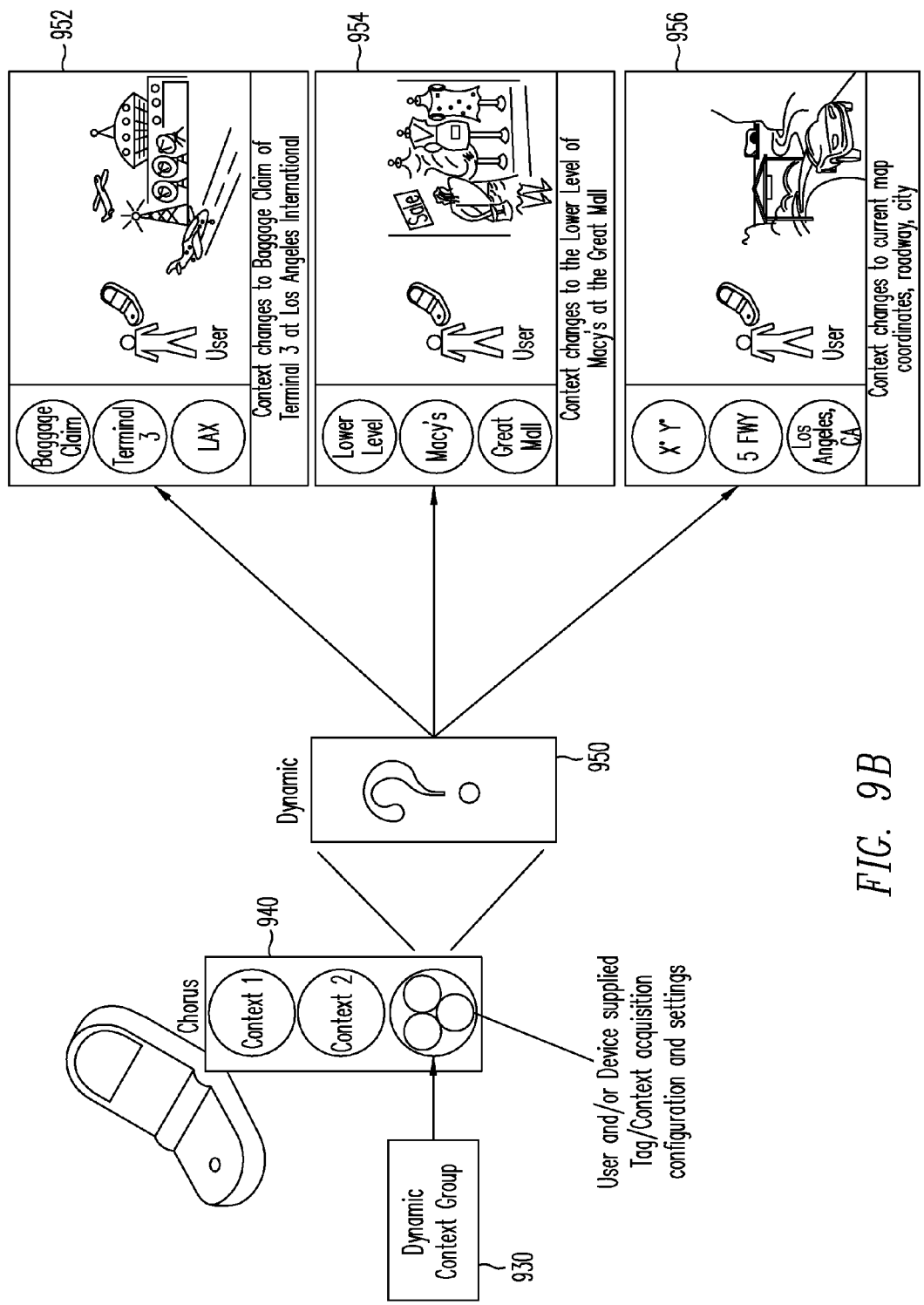

FIGS. 9A and 9B shows various embodiments of a method 900 for location awareness in the system. In various implementations, a reference point 910 may be used to dynamically create an ordered list of tags or contexts 920, 922, and 924 within a dynamic tag or context group 930. Designated publishers within a user's chorus 940 may provide tags or contexts for the reference point 910, and the server device 180 may arrange the tags or contexts into a dynamic group 950 of tag groupings 952, 954, and 956. The user's associated tag or context list may include one or more dynamic tag groups that are modified by a peripheral system or subsystem. One such subsystem may use location or proximity information to populate the group with one or more ordered list of tags. The server device 180 may use the reference point 910 to dynamically retrieve from a database and add to the tag or context list associated with the user a list of tags and/or tag groups. As such, in reference to FIGS. 9A and 9B, proximity information may be used to populate the dynamic context group 950 with relevant tags or contexts for a physical location and/or environment, such as reference point 910.

In one embodiment, referring to FIG. 9B, the system 100 may be implemented as a cell phone and/or PDA system, via an intranet, the Internet or cell phone network, where the user device 120 comprises a cell phone, PDA, or some other personal, portable, electronic device. For example, in one implementation, the cell phone may be in communication with the network 160 for network search requests made by the user 110.

Figure 10A:
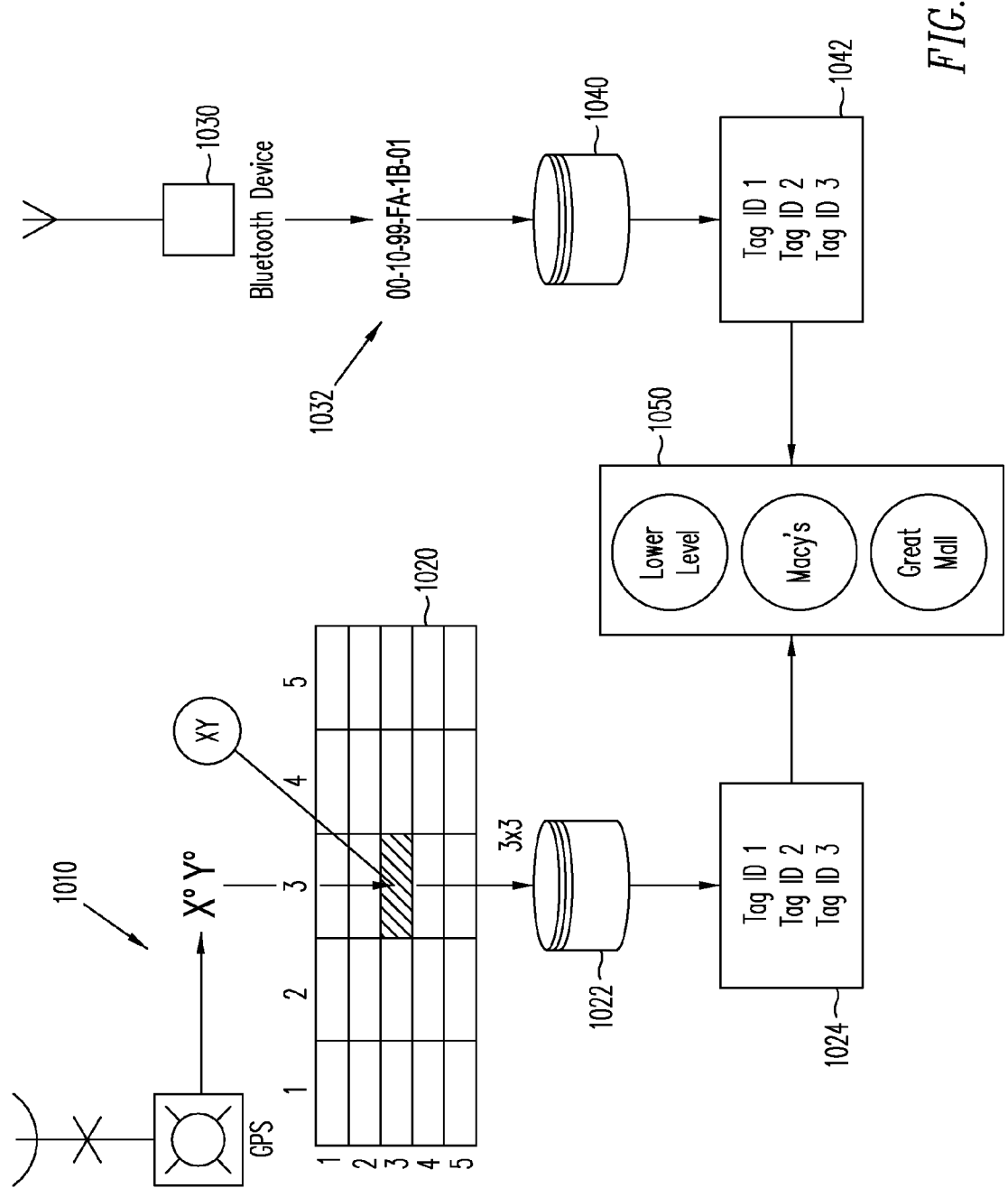
FIGS. 10A-10B show block diagrams illustrating location awareness associated with coordinate information in accordance with various embodiments of the present disclosure.

In one embodiment, as shown in FIG. 10, a global positioning system (GPS) reference point 1010 may be used to identify a larger map grid square 1020, and this may be associated with an ordered list of tags or contexts 1024 from a database 1022. In another embodiment, as shown in FIG. 10, a Bluetooth device 1030 may provide a medium access control (MAC) address 1032 that may be used to look up an ordered list of tags or contexts 1042 from a database 1040. These groups may include an indicator as to whether the system may combine tags or contexts within such a group with one another, or only other tags or contexts outside the group, as part of the chorus building process 1050.

Figure 10B:
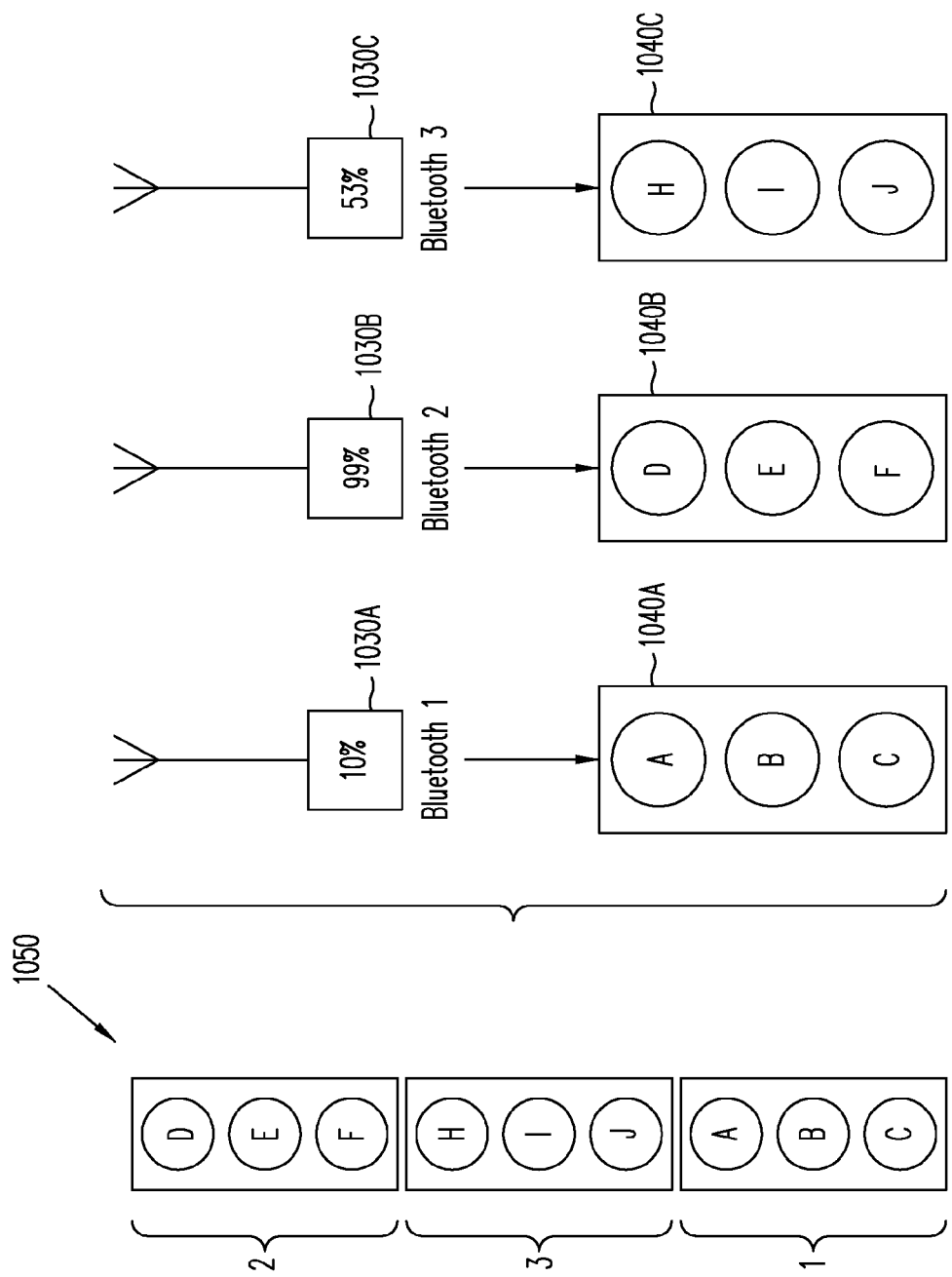

FIG. 10B shows one embodiment of dynamic context source priority, wherein an indicator of confidence, such as signal strengths 1030A, 1030B, and 1030C, may be used to prioritize ordered lists of tags or contexts 1040A, 1040B, and 1040C into a larger ordered list 1050. In various implementations, multiple sources may provide reference points, and these may be ordered by signal strength and/or other qualities to provide multiple ordered dynamic tag groups within a larger "situational" dynamic tag group. Select publishers in the user's chorus may provide their own ordered list of tags in relation to a reference point, and these may be organized into an array of tag groupings within a particular dynamic tag grouping.

As such, in reference to FIGS. 9A, 9B, 10A and 10B, a reference point, such as reference point 910, may be published and used to lookup an ordered list of relevant tags or contexts. A coordinate, such as GPS coordinate 1010, may map to the cell grid 1020 that may be used to determine a list of tags for the general area or location. The MAC address 1032 of the Bluetooth device 1030 may be used to provide a similar reference.

Figure 11A:
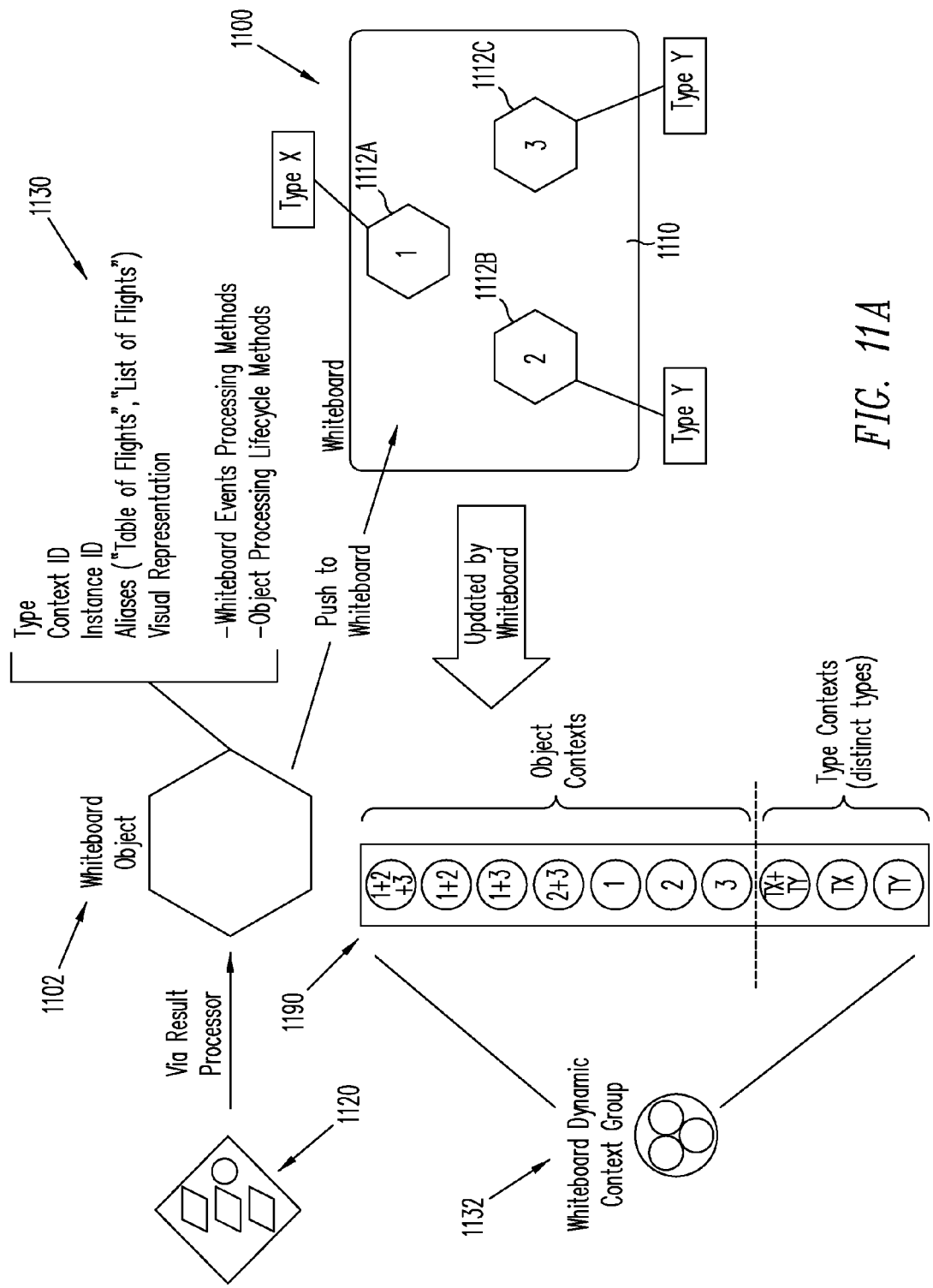
FIGS. 11A-11B show block diagrams illustrating whiteboard utilization in accordance with various embodiments of the present disclosure.
Figure 11B:
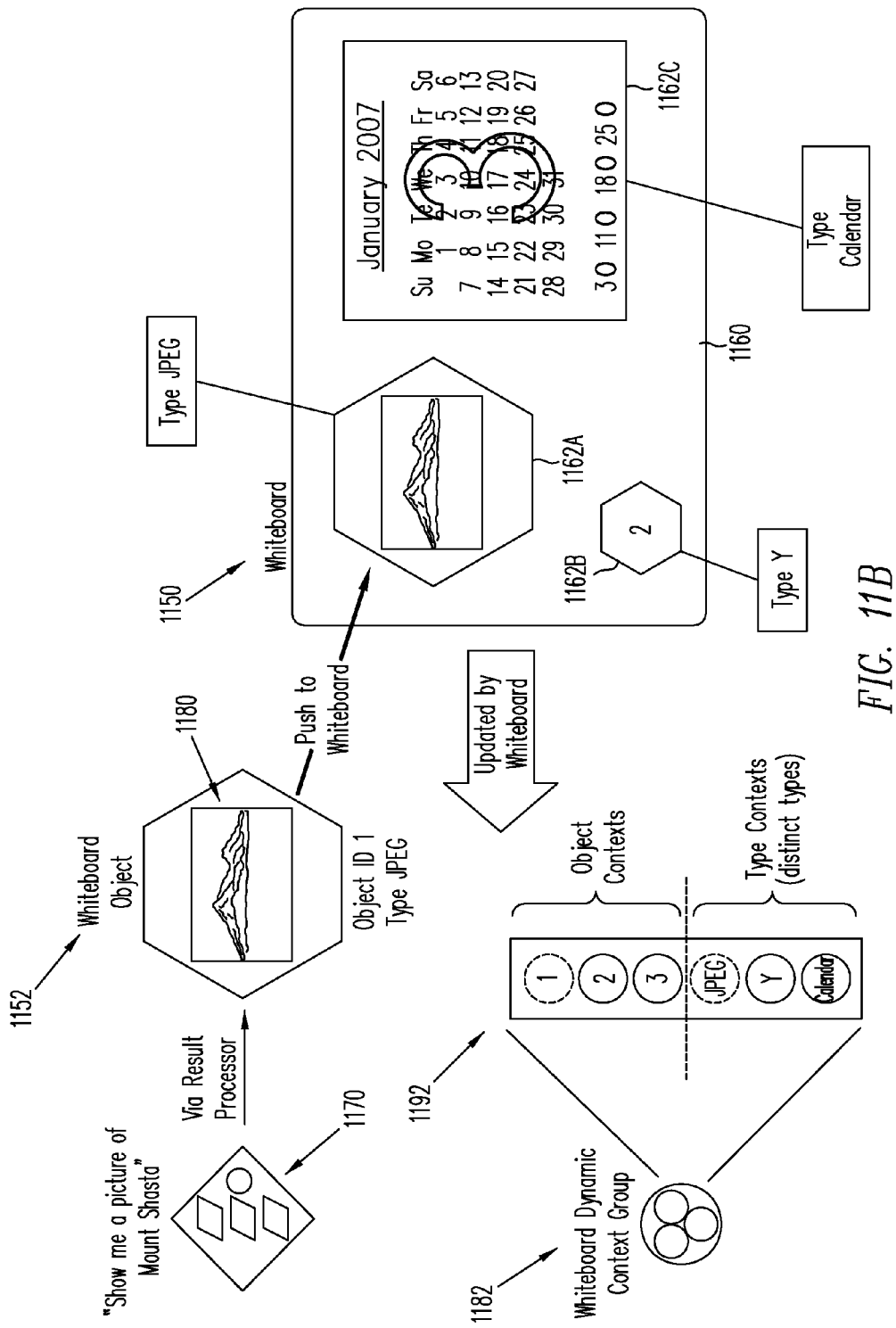

FIGS. 11A and 11B show various embodiments of using a whiteboard 1100 to build and/or modify a chorus 1190. In various implementations, responses 1120 may generate data objects 1130 in an environment that is static between queries, and these data objects 1130 may relate to and interact with the chorus 1190, the context chain, and/or each other. In some examples, it may be useful to ask the community to work on a problem that persists across a series of responses. In one implementation, the whiteboard 1100 comprises a hosting area 1110 for data and programs 1112A, 1112B, and 1112C that persist across a series of responses 1120. The whiteboard 1100 may be implemented as a "sandbox" program instance associated with each user. The whiteboard 1100 may modify the list of publishers and/or tags associated with a user, such as within a dynamic tag or publisher group 1132 designated for the whiteboard 1100. This combination of tag and/or publisher modification with the persistence of whiteboard objects 1102 may allow for a number of publishers to offer solutions with respect to the contents of the whiteboard 1100.

In one implementation, as shown in FIG. 11B, a triggered response 1170 may, as one of its instructions to the system, cause to be generated a whiteboard object 1152 on a hosting area 1160 of a user's whiteboard 1150. This whiteboard object 1152 may have an object oriented interface or data structure expected by the system, and may provide a means to obtain the object's type, context ID, instance ID, natural language instance IDs (aliases), and other information about the object, such as objects 1162A, 1162B, and 1162C. If at least one of the objects provides an object oriented interface known to the system, it may include methods that the system may call to signal various events that take place on the whiteboard 1150 and/or provide handles to at least one object so that it may utilize resources in the whiteboard environment or hosting space 1160.

In one embodiment, the system may call certain methods as part of a processing lifecycle. For example, when the at least one object is first created on the whiteboard 1150 or when other objects on the whiteboard are created or destroyed. The whiteboard 1150 may populate a dynamic tag or context group 1182 with tags or contexts corresponding to the objects' context IDs, followed by tags or contexts representing the objects' type. These changes may trigger the chorus building process 1192, so that subsequent queries may be considered with respect to the objects on the user's whiteboard 1150.

In one example, as shown in FIG. 11B, an activated response 1170, triggered by the query "show me a picture of Mount Shasta" may include instructions to generate an object 1162A on the user's whiteboard 1150 (e.g., based on data supplied in the response data blob) having a visual representation of a picture of Mount Shasta and an object Type of JPEG. The system may update a dynamic tag group 1182 associated with the whiteboard 1150 to include tags or contexts associated with the object itself followed by tags or contexts representing the object's type.

Figure 12:
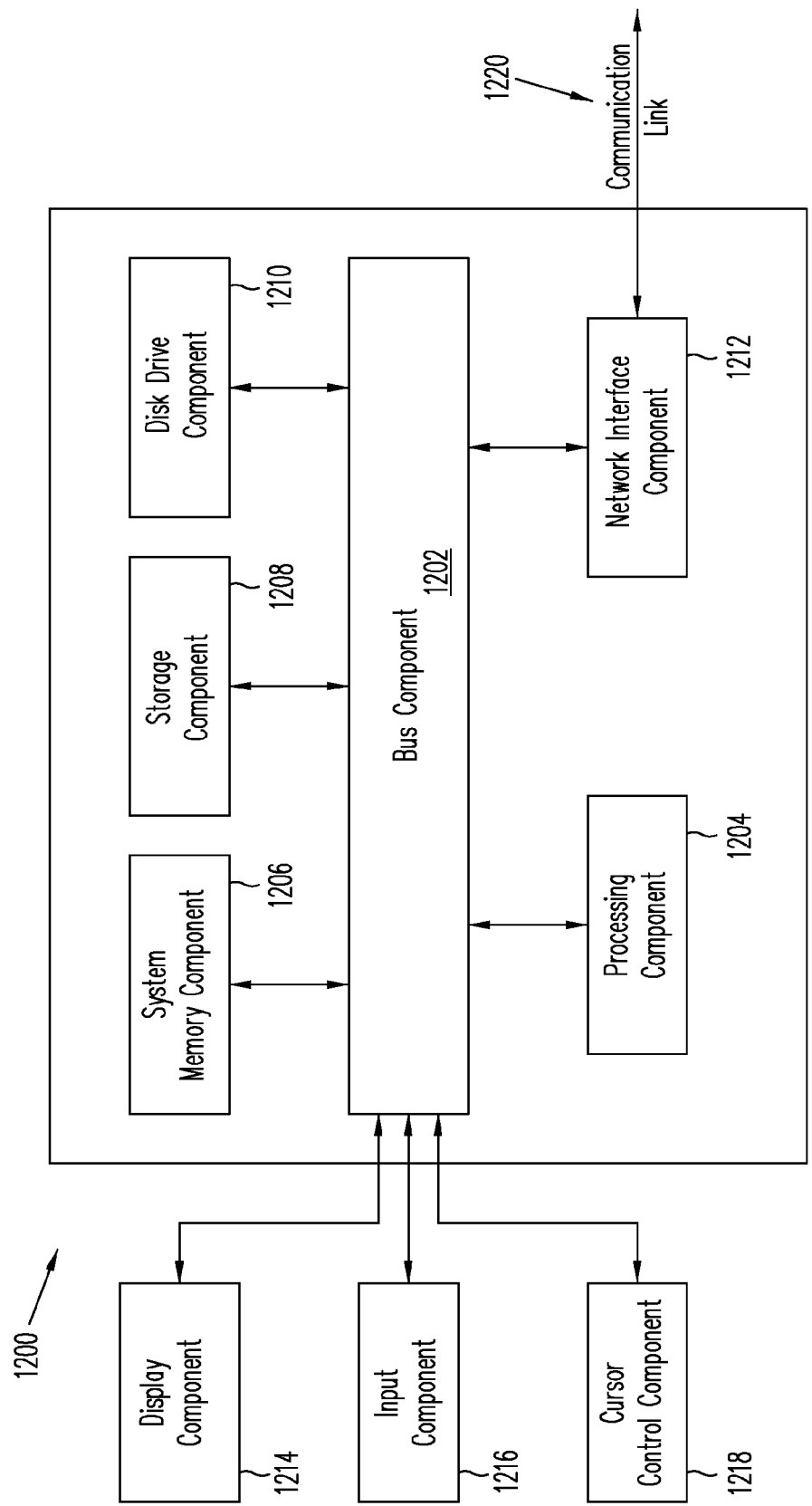
FIG. 12 is a block diagram of a computer system suitable for implementing embodiments of the present disclosure.

FIG. 12 is a block diagram of a computer system 1200 suitable for implementing embodiments of the present disclosure, including the user device 120 and the server device 180 of FIG. 1. In various implementations, the user device 120 may comprise a personal computing device, such as a personal computer, laptop, PDA, or others, and the server device 180 may comprise a network computing device, such as a server. Thus, it should be appreciated that, in one embodiment, each of the user devices 120 and server devices 180 may be implemented as computer system 1200 in a manner as follows.

In accordance with various embodiments of the present disclosure, computer system 1200, such as a personal computer and/or a network server, includes a bus 1202 or other communication mechanism for communicating information, which interconnects subsystems and components, such as processing component 1204 (e.g., processor, micro-controller, digital signal processor (DSP), or others), system memory component 1206 (e.g., RAM), static storage component 1208 (e.g., ROM), disk drive component 1210 (e.g., magnetic or optical), network interface component 1212 (e.g., modem or Ethernet card), display component 1214 (e.g., CRT or LCD), input component 1216 (e.g., keyboard, microphone, audio device), and cursor control component 1218 (e.g., mouse or trackball). In one implementation, disk drive component 1210 may comprise a database having one or more disk drive components.

In accordance with embodiments of the present disclosure, computer system 1200 performs specific operations by processor 1204 executing one or more sequences of one or more instructions contained in system memory component 1206. Such instructions may be read into system memory component 1206 from another computer readable medium, such as static storage component 1208 or disk drive component 1210. In other embodiments, hard-wired circuitry may be used in place of or in combination with software instructions to implement the present disclosure.

Logic may be encoded in a computer readable medium, which may refer to any medium that participates in providing instructions to processor 1204 for execution. Such a medium may take many forms, including but not limited to, non-volatile media, volatile media, and transmission media. In various implementations, non-volatile media includes optical or magnetic disks, such as disk drive component 1210, volatile media includes dynamic memory, such as system memory component 1206, and transmission media includes coaxial cables, copper wire, and fiber optics, including wires that comprise bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 1200. In various other embodiments of the present disclosure, a plurality of computer systems 1200 coupled by communication link 1220 (e.g., network 160 of FIG. 1, LAN, WLAN, PTSN, or various other wired or wireless networks) may perform instruction sequences to practice the present disclosure in coordination with one another.

Computer system 1200 may transmit and receive messages, data, information and instructions, including one or more programs (e.g., application code) through communication link 1220 and network interface component 1212. Received program code may be executed by processor 1204 as received and/or stored in disk drive component 1210 or some other non-volatile storage component for execution.

Figures 2, 13A:
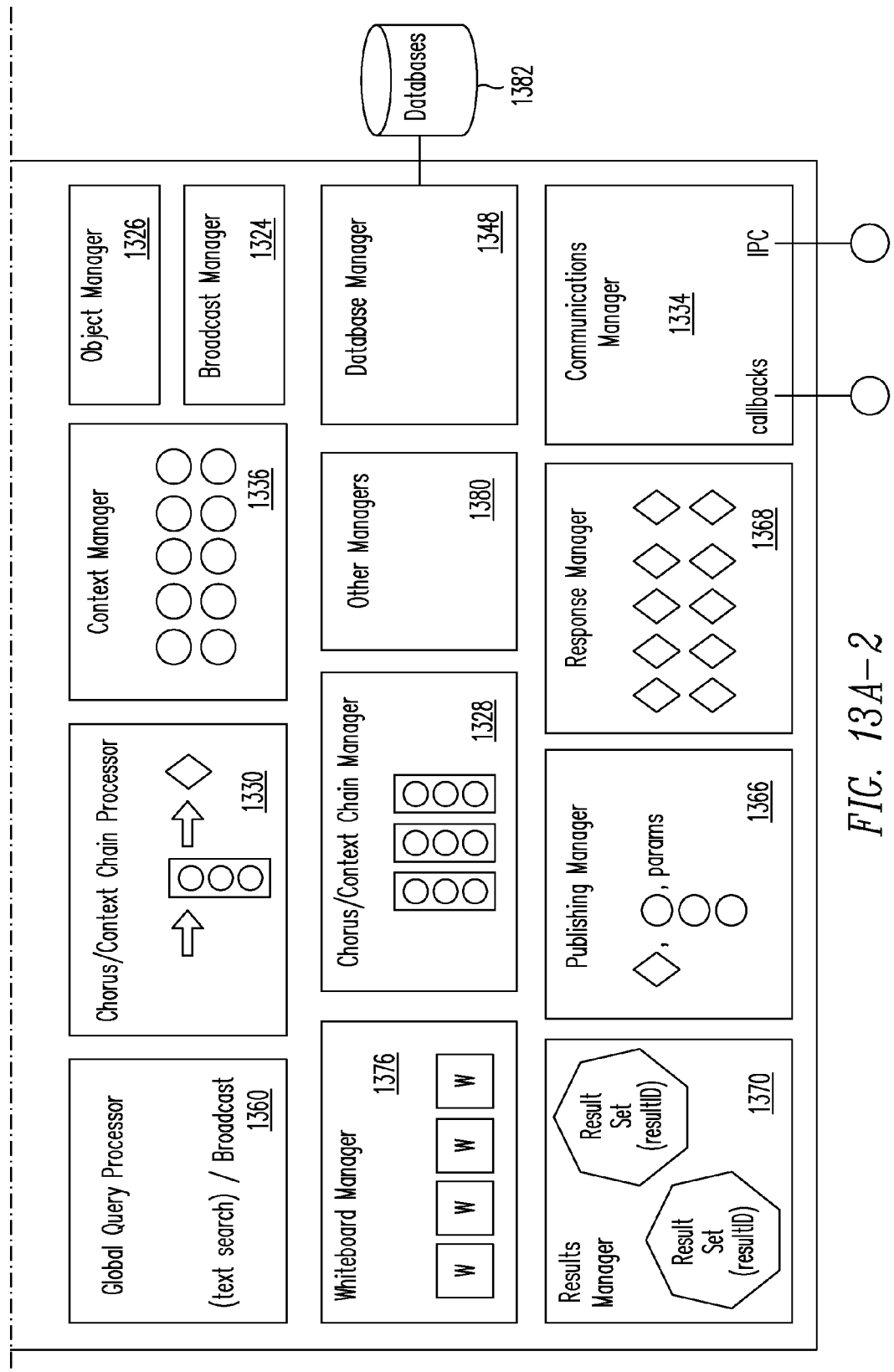
FIG. 13A is a block diagram of a search engine suitable for implementing embodiments of the present disclosure.
Figure 13B:
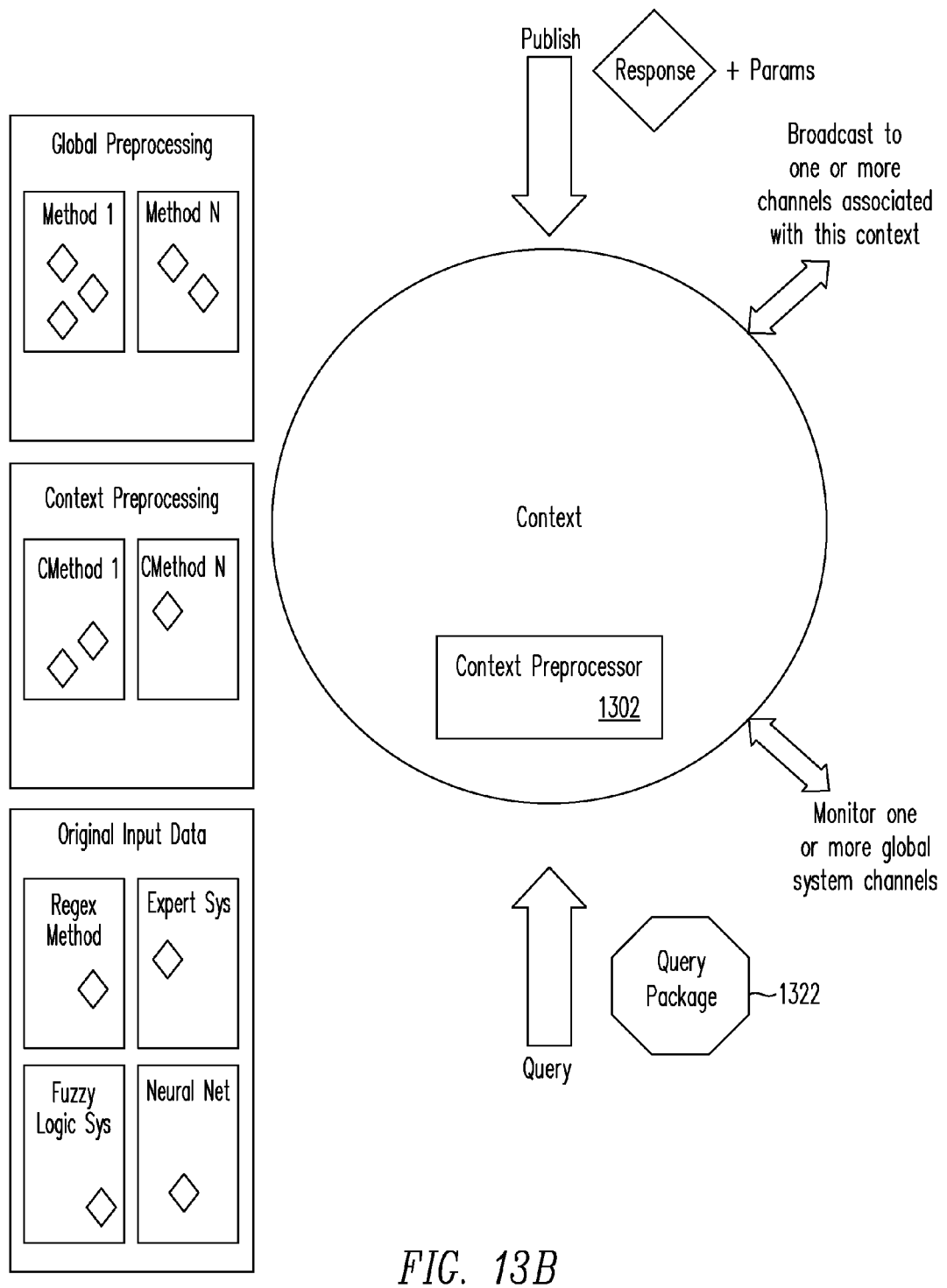
FIG. 13B shows one embodiment of context interfaces related to FIG. 13A in accordance with an embodiment of the present disclosure.

FIG. 13A shows one embodiment of a search engine 1300 (e.g., the context based search engine 182 of FIG. 1) for implementing the publish process 400 of FIG. 4 and/or the query process 700 of FIG. 7. FIG. 13B shows one embodiment of context interfaces to be used in conjunction with the description related to FIG. 13A.

In one embodiment, the server device 180 utilizes the search engine 1300, a user interface manager 1312 and a results processor 1316. The search engine 1300 may include a query processor 1318 and a query manager 1320. The search engine 1300 may include a broadcast manager 1324, an object manager 1326, a chorus/context chain (CCC) manager 1328, a chorus/context chain (CCC) processor 1330 and a query interface 1332. The search engine 1300 may include a communications manager 1334 and a context manager 1336.

In various implementations, the user 110 provides system input sources, such as electronic signal inputs, button press inputs, audio inputs, video inputs, and/or other inputs over network 160. The user interface manager 1312, in one embodiment, may receive or collect input from one or more input sources. It may accommodate multiple simultaneous user requests and/or inputs. The user interface manager 1312 may associate the data that it receives or collects with one or more users. It may then formulate one or more search engine 1300 queries based upon this input and/or other factors, which is described in greater detail herein. The user interface manager 1312 may buffer one or more inputs, determine when enough data is available to formulate a query for the search engine 1300, and submit such queries immediately or at a later time. The user interface manager 1312 may package certain information that a user may wish to publish (e.g., make accessible via a query to the search engine 1300) and enable necessary search engine 1300 interfaces to publish this information.

The search engine 1300, in one embodiment, may provide local and remote interfaces to submit queries, publish information, and access the interfaces of its many subsystems. The user interface manager 1312 may pass the result of the search engine 1300 query to the results processor 1316, which may then execute one or more response instructions of the query result, including any instructions that may cause the user interface manager 1312 to update one or more user interfaces.

The search engine 1300, in one embodiment, may include one or more subsystems including an alternates manager 1350. When the server device 180 is initialized, the alternates manager 1350 may load an ordered list of one or more alternate search engines 1314, which may be located on the server device 180 or remotely via the network 160. If the query processor 1318 is unable to identify a suitable response for a given query, the query manager 1320 may request that the alternates manager 1350 submit a query package 1322 to each of the search engines 1314 identified in the list (e.g. in sequence) until the output of a successful query is obtained and/or the list is exhausted. In one aspect, if successful, this query output may be relayed directly from the alternate search engines 1314 to the user 110 via the user interface manager 1312.

The broadcast manager 1324, in one embodiment, publishes data to one or more channels and/or subscribes to data from one or more channels. In various embodiments, a channel comprises a medium in which data that is published to the channel may be received nearly simultaneously by all subscribers to the channel. This may be implemented via free and/or commercial software, such as Internet Relay Chat (IRC) server and client software, TIBCO Information Bus software, or various other channel-oriented software that meets the need of the system as described herein. The broadcast manager 1324 may replace whiteboard IDs, context chain and/or chorus IDs and other potentially user identifiable IDs with aliases before broadcasting them to a channel so that two queries may be published for the same user without the channel subscriber community being able to relate the two. The object manager 1326, in one embodiment, may be used to register aliases for one or more objects.

The chorus/context chain manager 1328 may provide an interface for synchronized multi-user read and/or write operations on a user's chorus/context chain wherever it may be stored system-wide. In one implementation, this manager's interfaces may be enabled to push or pop a context onto or from a user's context chain, enumerate contexts within the chain, delete contexts from the chain, unwind a context chain to form an array and/or perform other operations on a chorus/context chain. The chorus/context chain manager 1328 may obtain programmatic handles to the context objects referenced by a chorus/context chain object, or delete context objects, wherever they may be system-wide, via the object manager 1326. In one aspect, the chorus/context chain manager 1328 may maintain a master copy of a user's chorus/context chain (and potentially one or more back-up master copies) and zero or more slave copies that may provide read-only access. The chorus/context chain manager 1328 may utilize the object manager 1326 to fetch, store, persist, modify, and/or lock a user's chorus/context chain without regard to its physical location system-wide.

In one implementation, the CCC processor 1330 may be passed a query package 1322 or a reference to a query package 1322. The CCC processor 1330 may obtain a programmatic handle, via the object manager 1326, to the chorus/context chain associated with the query package 1322. The CCC processor 1330 may then enable the query interface 1332 of each context object exposed by the chorus/context chain (in serial or parallel, depending on system configuration), passing the query package 1322 as a parameter.

Responses from a chorus/context chain may be pushed onto the result set associated with the query in the order of appearance in the chorus/context chain. The CCC processor 1330 may pop contexts from the context chain that have no response to the query until a context is reached that does have a response to the query (if any). In one embodiment, only context chain items are so removed, and chorus items may not be removed in this way. As the CCC processor 1330 obtains results from contexts as the result of a query, it tracks the start of most preferred results and most personal results (previously described herein) and adds the index of each to the result set entity. In another embodiment, if the context chain and chorus are empty, no responses are added to the results set.

The communications manager 1334, in one embodiment, may provide communication between two subsystems, which may reside on different physical servers, system-wide. The communications manager 1334 may take a subsystem address and a message, such as an XML message, as input, and return a response to the message from the target subsystem, if available. In various implementations, the communications manager 1334 may support zero or more publisher-call-back interfaces supporting various protocols such as HTTP, HTTPS, SMTP, TELNET, RPC, SOAP, and/or other protocols. The communications manager 1334 may identify callers via a credential and associate inbound and/or outbound communications with a user ID, publisher ID or another ID. In one aspect, publishers responding to a query observed on a broadcast channel may use information from the broadcast to connect to a network or other call-back interface exposed by the communications manager 1334 to submit their response.

In various embodiments, a context may support query, publish, and other methods. The context may support system and entity lifecycle events such as initialize, start, stop, and suspend. Context entities may support a common interface, but may vary in implementation and/or capabilities. In some implementations, reflection may be used to learn of these capabilities. The context interface may include methods that report its version and capabilities.

The server device 180 may run numerous context entity instances on multiple machines simultaneously. The context may be addressable system-wide via the context manager 1336, object manager 1326, and/or communications manager 1334 and may address any subsystem system-wide. The context may address local subsystems, such as a database manager 1348, and/or other local managers, via the search engine 1300.

In various embodiments, the context may subscribe to a pre-defined system-global channel via the broadcast manager 1324 to listen for system-wide events including events that may indicate that a given query result set is no longer needed. The context may utilize a handle to a system object that may provide synchronization and/or notification regarding various local system events. The context may monitor one or more channels for query package 1322 data and respond to the query as though coming from the query interface 1332 of the context and return result set data via the communications manager 1334 and/or another interface. The context may return a result set, and/or individual results within a result set, by value or by reference, depending on the size of the query, the system configuration and/or the context configuration, and/or other factors. The context may save a result set in memory for a period of time, persist a result set, or both. The context may delete a result set or remove it from memory upon receiving a signal a result set is no longer needed and/or at other times. The context may be associated with zero or more broadcast channels. Queries to the context may be republished to one or more of these channels and interested respondents (e.g. an entity that may optionally provide a response to a query) may use the information that is published to return a response to the context for potential inclusion in a result set.

In various embodiments, respondents may use interfaces provided by the communications manager 1334 and/or the broadcast manager 1324 (and potentially other interfaces) to provide a response. The context may wait a configurable period of time for respondents to provide responses before returning results, if any. The context may discard one or more responses received after this time period. The context may publish a message to one or more associated channels indicating the date and time that the context ended the response period. The context may broadcast other messages of interest to those subscribed to one or more channels associated with the context. Responses published to a context may include challenge acceptance criteria associated with it that tells the context how to determine whether a given response is valid for a given query. Publishers may indicate that one or more associated responses be evaluated by comparing or otherwise utilizing data synthesized from the original query by a global preprocessor 1304 and stored or referenced within the query package 1322. In one embodiment, the global preprocessor 1304 may use various techniques to pre-process a query and each result of this synthesis is identified by a preprocessing method ID that is stored (or referenced) along with the output of that method within the query package 1322.

In various embodiments, the context manager 1336 instance of a given context may perform a similar synthesis based on the original query present within query package 1322 at the time the context is queried. Responses published to a context may be grouped based on their method of evaluation (e.g., using global preprocessor method X, or using context manager 1336 method Y, or using a regular expression be evaluated against the source query, or using evaluation by an expert system, or other approaches) and evaluated together. In one aspect, these groups may be evaluated in parallel or serial, and if serial in a predictable order, depending on the system and/or context configuration and/or other factors. Some evaluation methods are computationally-intensive and may not be performed for all responses from all Publishers depending on the system and/or context configuration. In some cases, only the top n highest-ranked publishers or top n % highest ranked publishers may have computationally-intensive responses evaluated. Depending on the system and/or context configuration and/or other factors a context may only evaluate computationally-intensive and/or other responses if the publisher is in a chorus of user 110 (or context chain, depending on the system and/or context configuration) associated with the query.

In various embodiments, the context is a system-wide addressable object, registered with the object manager 1326. The context manager 1336 may be used to create and/or obtain and/or perform a number of operations on a context. Each context may be associated with a context manager 1336. Each context manager 1336 may be associated with a number of static and/or dynamically loadable modules that process the original query data (and/or other data) to synthesize new data. When the system instantiates a context entity, it may also load and instantiate context manager 1336 modules associated with the context. The data synthesized by each module may be characteristic of that module, and the output from each may be labeled with the preprocessor method ID associated with the module and saved or referenced within a predefined section of the query package 1322 data. One or more responses may specify a dependence upon the data synthesized by a certain module by specifying its preprocessor method ID as part of the response's challenge acceptance criteria data.

In various embodiments, a context manager 1336 may be associated with a context and may facilitate the loading of preprocessor modules. Preprocessing may be performed while other non-dependant responses are evaluated, and the context manager 1336 may provide signaling and/or synchronization to facilitate this behavior. A database manager 1348 facilitates search and data retrieval and data storage from a database system 1382 (e.g. context database 190 and/or external databases 192), including fetching, storing, searching, editing, and deleting various entities from the data store. A global preprocessor 1304 may be associated with the search engine 1300 and may facilitate the loading of preprocessor modules. Preprocessing may be performed while other non-dependant activities are performed, and the context manager 1336 may provide signaling and/or synchronization to facilitate this behavior.

In various embodiments, each search engine 1300 may be associated with the global preprocessor 1304, which is similar to a context preprocessor 1302 (shown in FIG. 13B), except that it performs preprocessing for all queries system-wide. Each global preprocessor 1304 may be associated with a number of static and/or dynamically loadable modules that process the original query data (and/or other data) to synthesize new data. When the server device 180 is initialized, it may also load and instantiate global query processor 1360 modules associated with the server device 180. The data synthesized by each module may be characteristic of that module, and the output from each may be labeled with the preprocessor method ID associated with the module and saved or referenced within a pre-defined section of query package 1322 data. One or more responses may specify a dependence upon the data synthesized by a certain module by specifying its preprocessor method ID as part of the response's challenge acceptance criteria data.

In various embodiments, the global query processor 1360 may use the broadcast manager 1324 to publish query package 1322 data (and other data that may be needed by respondents to respond) to one or more predefined global channels where zero or more subscribers may process arriving challenges and potentially submit a response via an interface of the communications manager 1334. Depending upon the system configuration the global query processor 1360 may also use any available technique to locate suitable responses via an examination of response records stored in database system 1382, including various forms of database text matching on challenge acceptance criteria. In one embodiment the global query processor 1360 ensures that responses are sorted by rank as indicated elsewhere herein. The global query processor 1360 may note the index of the start of the most popular responses in the result set associated with the query.

In various embodiments, a last resort manager 1364 determines the behavior of the server device 180 when it has exhausted all efforts to locate a suitable response to a given query. The last resort manager 1364 has access to all of the available information about the query and may take additional steps to construct a result set befitting the situation.

The object manager 1326 may facilitate storage, location, retrieval, serialization, moving, locking, redundancy, and higher availability of various objects, such as context, response, query package 1322 context, and other objects, system-wide. The server device 180 may utilize other managers 1380 that perform maintenance and/or other activities.

In various embodiments, a publishing manager 1366 may take a response, one or more contexts, and/or other parameters as input and perform the publishing task as a transaction that is guaranteed to succeed or fail as a unit.

A queuing manager 1368 provides a simple message queuing facility to subsystems inside and outside of the search engine 1300. This may be used to synchronize various activities across a number of distributed subsystems.

In various embodiments, the query manager 1320 steps a query through a number of stages, starting first with the query processor 1318, then falling back to the alternates manager 1350, and finally resorting to the last resort manager 1364. The query manager 1320 may handle multiple queries simultaneously. The query manager 1320 may create and initialize various query packages 1322, and/or manage the storage and retrieval of various query packages 1322. The query manager 1320 may create and initialize a result set and associate it with various query packages 1322. The query manager 1320 may specify a range of responses (e.g., 10-20) that should be returned, rather than all responses, to support user interface paging operations.

In various embodiments, a query package 1322 stores or references information about a given query, such as the query ID, the user ID of the user 110 that made the query, the user's whiteboard ID, data synthesized from various preprocessor modules, and/or other information. The query processor 1318 may manage the portions of the query processes involving the global query processor 1360 and the chorus/context chain processor 1330. The query processor 1318 may initiate queries to these subsystems in serial or parallel depending on the system configuration and may cause such queries to timeout after a period of time based on the system configuration.

In various embodiments, the response manager 1368 provides synchronized multi-user read and/or write access and distributed storage for responses. Contexts may keep response challenge acceptance data in memory but only keep a reference to a complete response with the response manager 1368.

In various embodiments, the result set comprises a logical composition for a set of responses and/or metadata about the results that it comprises or references. Various subsystems may add responses to the result set as they become available. The result set may also remove duplicate responses from appearing in a result set (e.g. preferring the highest ranked). Result sets may be nested and/or comprise one or more responses and/or references to one or more responses and/or other data objects.

In various embodiments, a results manager 1370 may support synchronized read operations, write operations and/or other operations on the result set associated with a query. The results manager 1370 may remove one or more result sets after a period of inactivity. The results manager 1370 may facilitate paging by returning only requested segments of the result set.

In various embodiments, the results processor 1316 may execute instructions of a response when directed by the user interface manager 1312 or other subsystem. The results processor 1316 may be asked to "undo" the instructions of a response when directed by the user interface manager 1312 or other subsystem, as described herein.

In various embodiments, response instructions may be a sequence of one or more instructions that may be parsed by the results processor 1316. The response instructions may specify parameters to use a capability of the response processor. For example, a response instruction may cause the results processor 1316 to create one or more objects on the user's whiteboard, push one or more contexts onto the context chain associated with the query, and take any number of arbitrary actions that may be supported by the results processor 1316 and utilized by the publishing community.

In various embodiments, a search engine object comprises a local object that may provide references to each local subsystem. All subsystems may have access to this object and may directly programmatically access the exposed interfaces of any other subsystem. The search engine 1300 may initialize, start, stop, and/or suspend many other subsystems as well as, in some implementations, publish events to one or more system-wide broadcast channels.

In various embodiments, the search engine 1300 may include a security manager 1306 that may be used to set or retrieve permissions on various user-data and other objects used by the server device 180. The security manager 1306 may be used to test whether an actor is permitted to perform a certain action on a referenced object. In various embodiments, the search engine 1300 may include a storage manager 1308 that may expose facilities of a simple storage service that may store and/or retrieve data blobs of various sizes. In various embodiments, a whiteboard manager 1376 may provide synchronized multi-user access to one or more user whiteboards, and support object instantiation, and object lifecycle management for one or more whiteboard objects. The whiteboard manager 1376 may modify one or more dynamic context groups associated with the chorus/context chain of an associated user as discussed herein.

In various embodiments, referring to the publish process 400 of FIG. 4, the user 110 may publish to the search engine 1300 via the programmatic interface provided by the publishing manager 1366. The user 110 may create and populate a new response object via the response manager 1368, obtain references to one or more target contexts that may receive a reference to the response via the context manager 1336, and supply these and any other optional parameters, such as permissions or other configuration parameters, to a operation of the publishing manager 1366. The publishing manager 1366 may assign a rank based on the ranking approach described elsewhere herein, or it may assign an initial rank that may be updated by a batch process that may run as part of the regular maintenance process. The publishing manager 1366 may then utilize the context manager 1336 to enable the publish operation of the target context. The context may then store a reference to the response in the appropriate processing area based on the type of processing required by the challenge acceptance criteria of the response.

In various embodiments, referring to the query process 700 of FIG. 7, the user 110 may query the search engine 1300 via the programmatic interface provided by the query manager 1320. The query manager 1320 may then create and populate a query package 1322 and invoke the query interface 1332 of the query processor 1318 supplying a reference to the query package 1322. The query processor 1318 may then query the chorus/context chain as described herein, and the global query processor 1360 may query other contexts not in the chorus/context chain, as described herein. In on embodiment, contexts may be queried as described herein. In another embodiment, results may be added to the results set associated with the query package 1322 via the results manager 1370, as described herein.

In various embodiments, if no responses are returned from the query processor 1318, the query manager 1320 may attempt to obtain responses via the alternates manager 1350. If no responses are obtained from the alternates manager 1350, the query manager 1320 may enable the last resort manager 1364. To achieve the same affect as the user 110 querying the server device 180 via the user interface, the user 110 may then enable the results processor 1316 to supply a reference to the result set and a handle to a user interface output stream provided to user device 120 over network 160.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for facilitating data searching over a network, the system comprising:
   a first component adapted to communicate with a user via a user device over the network;
   a second component adapted to receive a search request from the user via the user device over the network, process the search request by identifying a context chain related to the user based on information passed with the search request, and provide a search result in response to the search request; and
   a database adapted to store information including the context chain related to the user, the context chain including a plurality of contexts, each context in the plurality of contexts being a private context in which content is controlled by a publisher, or a public context in which content is not controlled by a publisher,
   wherein the second component selects at least one context from the context chain from which to obtain the search result.

2. The system of claim 1, wherein a subset of the plurality of contexts in the context chain are formed as a group of contexts.

3. The system of claim 1, wherein the user is associated with at least one user data object stored in the database in a record, and wherein the user data object includes user parameters and related information including a user ID and a user credential, and wherein the user ID identifies the user or the user device.

4. The system of claim 1, wherein at least one context in the plurality of contexts is associated with at least one publisher data object stored in the database in a record, and wherein the publisher data object includes publisher parameters and related information including at least one of a publisher ID, a publisher name, and a publisher description, and wherein the publisher data object represents a viewpoint of one or more users across a range of searchable topics, and wherein the publisher ID identifies a publisher that publishes a response to a challenge within the one or more contexts.

5. The system of claim 1, wherein at least one context in the plurality of contexts is associated with at least one tag data object stored in the database in a record, and wherein the tag data object includes tag parameters and related information including a tag ID that associates a word or phrase with the one or more contexts.

6. The system of claim 1, wherein at least one context in the plurality of contexts is associated with at least one context data object stored in the database in a record, and wherein the context data object includes context parameters and related information including a context ID.

7. The system of claim 1, wherein at least one context in the plurality of contexts is associated with at least one response data object stored in the database in a record, and wherein the response data object includes response parameters and related information including at least one of response metadata and response instructions.

8. The system of claim 1, wherein at least one context in the plurality of contexts is associated with at least one challenge data object stored in the database in a record, and wherein the challenge data object includes challenge parameters and related information including at least one of challenge acceptance data and challenge expression data.

9. The system of claim 1, wherein the first component is adapted to communicate with the user device via a network browser application.

10. The system of claim 9, wherein the user device further comprises a user input device that allows audio communication with the user, and wherein the network browser application is adapted to recognize speech as an input from the user.

11. The system of claim 1, wherein the second component is adapted to verify the identity of the user based on information passed with the search request.

12. The system of claim 1, wherein the database is adapted to maintain a user account associated with the user, and wherein the user account includes account information related to the user.

13. The system of claim 12, wherein the user information comprises confidential information of the user including at least one of an account number and a password.

14. The system of claim 1, wherein the user device comprises a network device including at least one of a network computer or a network server.

15. A method for facilitating data searching over a network, the method comprising:
receiving a search request from a user device via the network, the search request including information related to the user device;
processing the search request by identifying a context chain related to the user device based on information passed with the search request, the context chain including a plurality of contexts, each context in the plurality of contexts being a private context in which content is controlled by a publisher, or a public context in which content is not controlled by a publisher;
and
responding to the search request by providing at least one search result to the user device, the search result being obtained from at least one context in the plurality of contexts.

16. The method of claim 15, further comprising processing the selected contextual information based on the at least one context and information passed with the search request.

17. The method of claim 15, wherein the user device is associated with at least one user data object stored in a database record, and wherein the user data object includes user parameters and related information including a user ID and a user credential, and wherein the user ID identifies the user device.

18. The method of claim 15, wherein at least one context in the plurality of contexts is associated with at least one publisher data object stored in a database record, and wherein the publisher data object includes publisher parameters and related information including at least one of a publisher ID, a publisher name, and a publisher description, and wherein the publisher data object represents a viewpoint of one or more users across a range of searchable topics, and wherein the publisher ID identifies a publisher that publishes a response to a challenge within the one or more contexts.

19. The method of claim 15, wherein at least one context in the plurality of contexts is associated with at least one tag data object stored in a database record, and wherein the tag data object includes tag parameters and related information including a tag ID that associates a word or phrase with the one or more contexts.

20. The method of claim 15, wherein at least one context in the plurality of contexts is associated with at least one context data object stored in a database record, and wherein the context data object includes context parameters and related information including a context ID.

21. The method of claim 15, wherein at least one context in the plurality of contexts is associated with at least one response data object stored in a database record, and wherein the response data object includes response parameters and related information including at least one of response metadata and response instructions.

22. The method of claim 15, wherein at least one context in the plurality of contexts is associated with at least one challenge data object stored in a database record, and wherein the challenge data object includes challenge parameters and related information including at least one of challenge acceptance data and challenge expression data.

23. A software program encoded in one or more non-transitory media structurally and functionally interrelated to the software program in such a manner that enables the software program to act as computer component and realize functionality, the software program when executed:
receives a search request from a user device via the network, the search request including information related to the user device;
processes the search request by identifying at least one context related to the user device based on information passed with the search request, the context chain including a plurality of contexts, each context in the plurality of contexts being a private context in which content is controlled by a publisher, or a public context in which content is not controlled by a publisher; and responds to the search request by providing at least one search result to the user device, the search result being obtained from at least one context in the plurality of contexts.

24. The software program of claim 23, wherein a subset of the plurality of contexts in the context chain are formed as a group of contexts.

* * * * *